(12) United States Patent
Liu et al.

(10) Patent No.: US 12,057,764 B2
(45) Date of Patent: *Aug. 6, 2024

(54) SYSTEMS AND METHODS FOR A CONTROLLER FOR REDUCING POWER LOSS OF POWER CONVERTERS

(71) Applicant: ON-BRIGHT ELECTRONICS (SHANGHAI) CO., LTD., Shanghai (CN)

(72) Inventors: Tuofu Liu, Shanghai (CN); Xiangkun Zhai, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,866

(22) Filed: Nov. 9, 2022

(65) Prior Publication Data
US 2023/0216403 A1 Jul. 6, 2023

Related U.S. Application Data

(63) Continuation of application No. 16/595,132, filed on Oct. 7, 2019, now Pat. No. 11,532,983.

(30) Foreign Application Priority Data

Aug. 29, 2019 (CN) .......................... 201910807150.6

(51) Int. Cl.
*H02M 3/156* (2006.01)
*H02M 1/00* (2006.01)
(Continued)

(52) U.S. Cl.
CPC ............ *H02M 1/0006* (2021.05); *H02M 1/08* (2013.01); *H02M 3/156* (2013.01); *H02M 7/217* (2013.01)

(58) Field of Classification Search
CPC .......................... H02M 1/0025; H02M 1/0006
See application file for complete search history.

(56) References Cited

U.S. PATENT DOCUMENTS

| 7,826,237 B2 | 11/2010 | Zhang et al. |
| 8,310,845 B2 | 11/2012 | Gaknoki et al. |

(Continued)

FOREIGN PATENT DOCUMENTS

| CN | 104660022 A | 5/2015 |
| CN | 106026618 A | 10/2016 |

(Continued)

OTHER PUBLICATIONS

China Patent Office, Office Action mailed Dec. 15, 2020, in Application No. 201910807150.6.

(Continued)

*Primary Examiner* — Peter M Novak
(74) *Attorney, Agent, or Firm* — Faegre Drinker Biddle & Reath LLP

(57) ABSTRACT

Controller and method for a power converter. For example, a controller for a power converter includes: a first terminal configured to receive a first terminal voltage; a second terminal configured to receive a second terminal voltage; a comparator configured to receive a first threshold voltage and the second terminal voltage and to generate a comparison signal based at least in part on the first threshold voltage and the second terminal voltage; and a switch configured to receive the first terminal voltage and the comparison signal, the switch being further configured to be closed to allow a current to flow out of the second terminal through the switch if the comparison signal is at a first logic level; wherein the comparator is further configured to: receive a first reference voltage as the first threshold voltage if the first terminal voltage is smaller than a second threshold voltage.

28 Claims, 18 Drawing Sheets

(51) Int. Cl.
   *H02M 1/08* (2006.01)
   *H02M 7/217* (2006.01)

(56) References Cited

U.S. PATENT DOCUMENTS

| | | |
|---|---|---|
| 10,091,859 B2 | 10/2018 | Ho et al. |
| 11,532,983 B2 | 12/2022 | Liu et al. |
| 2010/0073351 A1* | 3/2010 | Lin .................. H02M 3/33523 |
| | | 345/212 |
| 2017/0141683 A1 | 5/2017 | Vacca et al. |
| 2021/0067027 A1 | 3/2021 | Liu et al. |

FOREIGN PATENT DOCUMENTS

| | | |
|---|---|---|
| CN | 109510484 A | 3/2019 |
| JP | 2016-093086 A | 5/2016 |
| TW | 201218592 A | 5/2012 |
| TW | 201404011 A | 1/2014 |
| TW | 201907651 A | 2/2019 |
| TW | 201931743 A | 8/2019 |

OTHER PUBLICATIONS

China Patent Office, Office Action mailed Dec. 3, 2021, in Application No. 201910807150.6.
Taiwan Patent Office, Notice of Allowance mailed Oct. 5, 2020, in Application No. 108139947.

* cited by examiner

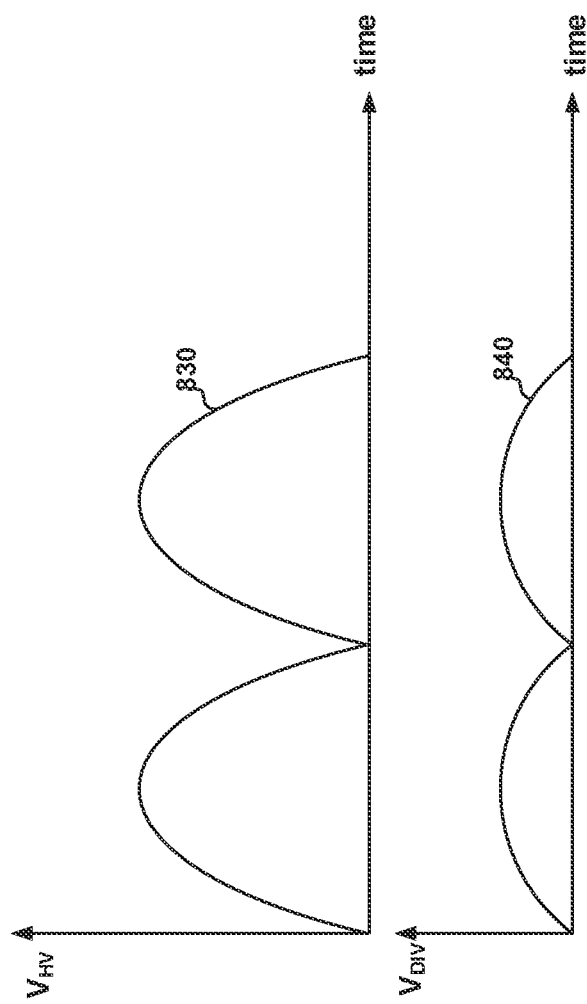

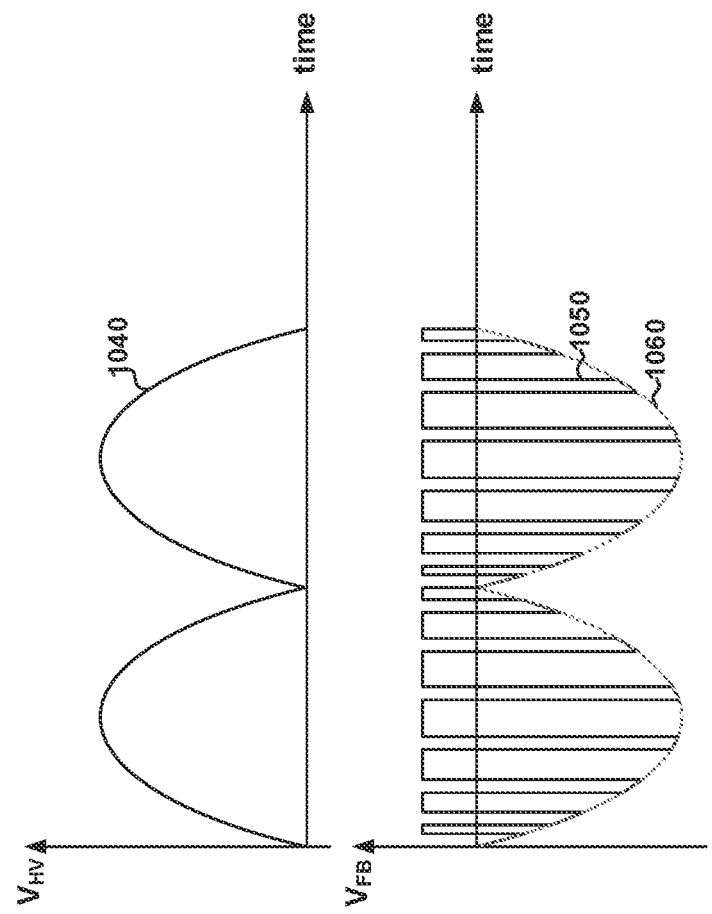

SYSTEMS AND METHODS FOR A CONTROLLER FOR REDUCING POWER LOSS OF POWER CONVERTERS

1. CROSS-REFERENCES TO RELATED APPLICATIONS

This application is a continuation of U.S. patent application Ser. No. 16/595,132, filed Oct. 7, 2019, which claims priority to Chinese Patent Application No. 201910807150.6, filed Aug. 29, 2019, both of the above applications being incorporated by reference herein for all purposes.

2. BACKGROUND OF THE INVENTION

Certain embodiments of the present invention are directed to integrated circuits. More particularly, some embodiments of the invention provide systems and methods for reducing power loss of power converters. Merely by way of example, some embodiments of the invention have been applied to power converters with high voltage supplies. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level. The power converters include linear converters and switch-mode converters.

Many conventional power converters include power-management chips. Some power-management chips receive low-voltage supply, and certain power-management chips receive high voltage supply. The power-management chips that receive the high voltage supply often do not need to use additional start-up and power supply components; therefore these power-management chips usually can reduce cost and volume of the power converters.

FIG. 1 is a simplified diagram showing a conventional AC-to-DC power converter. The power converter 100 includes diodes 102, 104, 106, 108 and 134, capacitors 110, 132 and 136, a resistor 114, a controller 120, an inductor 138, and a switch 160. The controller 120 (e.g., a chip) includes terminals 122, 124, 126, 128 and 130 (e.g., pins). Additionally, the controller 120 (e.g., a chip) includes a voltage control component 140 (e.g., a VDD control component), an undervoltage-lockout component 142 (e.g., a UVLO component), a demagnetization-detection component 144, a constant-current and/or constant-voltage regulation component 146 (e.g., a CC/CV regulation component), a current sensing component 148, a protection component 150, a modulation control component 152, and a driver 154. Moreover, the capacitor 136 includes terminals 116 and 118. For example, the power converter 100 is an AC-to-DC buck converter.

In some examples, the switch 160 is a transistor. In certain examples, the modulation control component 152 is a pulse-width-modulation (PWM) control component. According to some embodiments, the power converter 100 provides an output current and/or an output voltage to a load 190. According to certain embodiments, the capacitor 136 is a polarized capacitor that includes the anode terminal 116 and the cathode terminal 118, and the anode terminal 116 is connected to the terminal 128.

As shown in FIG. 1, the capacitor 132 provides a voltage 166 (e.g., $V_{DD}$) to the controller 120 through the terminal 130, and the controller 120 also receives a voltage 162 at the terminal 128. The capacitor 110 provides a voltage 112 (e.g., $V_{IN}$), which is equal to the voltage 162, and the anode terminal 116 of the polarized capacitor 136 is also biased at the voltage 162.

FIG. 2 is a simplified diagram showing another conventional AC-to-DC power converter. The power converter 200 includes diodes 202, 204, 206, 208 and 234, capacitors 210, 232 and 236, a resistor 214, a controller 220, an inductor 238, and a switch 260. The controller 220 (e.g., a chip) includes terminals 222, 224, 226, 228 and 230 (e.g., pins). Additionally, the controller 220 (e.g., a chip) includes a voltage control component 240 (e.g., a VDD control component), an undervoltage-lockout component 242 (e.g., a UVLO component), a demagnetization-detection component 244, a constant-current and/or constant-voltage regulation component 246 (e.g., a CC/CV regulation component), a current sensing component 248, a protection component 250, a modulation control component 252, and a driver 254. Moreover, the capacitor 236 includes terminals 216 and 218. For example, the power converter 200 is an AC-to-DC buck-boost converter.

In some examples, the switch 260 is a transistor. In certain examples, the modulation control component 252 is a pulse-width-modulation (PWM) control component. According to some embodiments, the power converter 200 provides an output current and/or an output voltage to a load 290. According to certain embodiments, the capacitor 236 is a polarized capacitor that includes the anode terminal 216 and the cathode terminal 218, and the anode terminal 216 is connected to the terminal 228.

As shown in FIG. 2, the capacitor 232 provides a voltage 266 (e.g., $V_{DD}$) to the controller 220 through the terminal 230, and the controller 220 also receives a voltage 262 at the terminal 228. The capacitor 210 provides a voltage 212 (e.g., $V_{IN}$), and the anode terminal 216 of the polarized capacitor 236 is biased at the voltage 262.

FIG. 3 is a simplified diagram showing at least certain components of a conventional AC-to-DC power converter. Certain components of the power converter 300 include diodes 302, 304, 306 and 308, capacitors 310 and 332, and a controller 320. Certain components of the controller 320 (e.g., a chip) includes terminals 326, 328 and 330 (e.g., pins), and a voltage control component 340 (e.g., a VDD control component). As shown in FIG. 3, the voltage control component 340 includes a junction-gate field-effect transistor (JFET) 380, a diode 382, and a comparator 384. In certain examples, the power converter 300 is the power converter 100, which for example is an AC-to-DC buck converter. In some examples, the power converter 300 is the power converter 200, which for example is an AC-to-DC buck-boost converter.

As shown in FIG. 3, the JFET 380 includes a drain terminal 390, a source terminal 392, and a gate terminal 394, and the comparator 384 includes input terminals 370 and 372 and an output terminal 374. The capacitor 332 provides a voltage 366 (e.g., $V_{DD}$) to the controller 320 through the terminal 330, and the controller 320 also receives a voltage 362 (e.g., $V_{HV}$) at the terminal 328. Additionally, the capacitor 310 provides a voltage 312 (e.g., $V_{IN}$).

According to some embodiments, the power converter 300 is the same as the power converter 100. In some examples, the diodes 302, 304, 306, and 308 are the same as the diodes 102, 104, 106, and 108 respectively, the capacitors 310 and 332 are the same as the capacitors 110 and 132 respectively, and the controller 320 is the same as the controller 120. In certain examples, the terminals 326, 328, and 330 are the same as the terminals 126, 128, and 130 respectively, and the voltage control component 340 is the same as the voltage control component 140. In some examples, the voltage 366 (e.g., $V_{DD}$) is the same as the voltage 166 (e.g., $V_{DD}$), the voltage 362 is the same as the voltage 162, and the voltage 312 (e.g., $V_{IN}$) is the same as the voltage 112 (e.g., $V_{IN}$).

According to certain embodiments, the power converter 300 is the same as the power converter 200. In some examples, the diodes 302, 304, 306, and 308 are the same as the diodes 202, 204, 206, and 208 respectively, the capacitors 310 and 332 are the same as the capacitors 210 and 232 respectively, and the controller 320 is the same as the controller 220. In certain examples, the terminals 326, 328, and 330 are the same as the terminals 226, 228, and 230 respectively, and the voltage control component 340 is the same as the voltage control component 240. In some examples, the voltage 366 (e.g., $V_{DD}$) is the same as the voltage 266 (e.g., $V_{DD}$), the voltage 362 is the same as the voltage 262, and the voltage 312 (e.g., $V_{IN}$) is the same as the voltage 212 (e.g., $V_{IN}$).

As shown in FIG. 3, the comparator 384 receives a voltage 364 (e.g., $V_{REF}$) at the terminal 370 and the voltage 366 (e.g., $V_{DD}$) at the terminal 372, and outputs a signal 368 at the terminal 374. The voltage 366 (e.g., $V_{DD}$) is provided by the capacitor 332 through the terminal 330, and the signal 368 is received by the gate terminal 394 of the JFET 380. The voltage control component 340 is configured to keep the voltage 366 (e.g., $V_{DD}$) stable, around the voltage 364 (e.g., $V_{REF}$).

If the voltage 366 (e.g., $V_{DD}$) becomes smaller than the voltage 364 (e.g., $V_{REF}$), the signal 368 is at the logic high level and the JFET 380 is turned on by the signal 368. When the JFET 380 is turned on, a current 396 (e.g., $I_{JFET}$) has a magnitude that is larger than zero, and the current 396 flows through the JFET 380, the diode 382 and the terminal 330 and charges the capacitor 332 to raise the voltage 366 (e.g., $V_{DD}$). If the voltage 366 (e.g., $V_{DD}$) becomes larger than the voltage 364 (e.g., $V_{REF}$), the signal 368 is at the logic low level and the JFET 380 is turned off by the signal 368. When the JFET 380 is turned off, the current 396 (e.g., $I_{JFET}$) has a magnitude that is equal to zero, and the current 396 does not charge the capacitor 332.

As shown in FIG. 1, FIG. 2, and FIG. 3, the power-management chips that receive the high voltage supply often can reduce cost and volume of the power converters, but they usually also reduce system efficiency of the power converters. Hence it is highly desirable to improve the techniques of power-management chips with high voltage supply.

3. BRIEF SUMMARY OF THE INVENTION

Certain embodiments of the present invention are directed to integrated circuits. More particularly, some embodiments of the invention provide systems and methods for reducing power loss of power converters. Merely by way of example, some embodiments of the invention have been applied to power converters with high voltage supplies. But it would be recognized that the invention has a much broader range of applicability.

According to certain embodiments, a controller for a power converter includes: a first terminal configured to receive a first terminal voltage; a second terminal configured to receive a second terminal voltage; a comparator configured to receive a first threshold voltage and the second terminal voltage and to generate a comparison signal based at least in part on the first threshold voltage and the second terminal voltage; and a switch configured to receive the first terminal voltage and the comparison signal, the switch being further configured to be closed to allow a current to flow out of the second terminal through the switch if the comparison signal is at a first logic level; wherein the comparator is further configured to: receive a first reference voltage as the first threshold voltage if the first terminal voltage is smaller than a second threshold voltage; and receive a second reference voltage as the first threshold voltage if the first terminal voltage is larger than the second threshold voltage; wherein the first reference voltage is larger than the second reference voltage; wherein the comparator is further configured to: generate the comparison signal at the first logic level if the first threshold voltage is larger than the second terminal voltage; and generate the comparison signal at a second logic level if the first threshold voltage is smaller than the second terminal voltage; wherein the second logic level is different from the first logic level.

According to some embodiments, a controller for a power converter includes: a first terminal configured to receive a first terminal voltage; a second terminal configured to receive a second terminal voltage; a first comparator configured to receive a first threshold voltage and a comparator input voltage and generate a first comparison signal based at least in part on the first threshold voltage and the comparator input voltage, the first comparator being further configured to generate the first comparison signal at a first logic level if the first threshold voltage is larger than the comparator input voltage and to generate the first comparison signal at a second logic level if the first threshold voltage is smaller than the comparator input voltage, the second logic level being different from the first logic level; a first switch configured to receive the first comparison signal and to output a second threshold voltage, the switch being further configured to output a first reference voltage as the second threshold voltage if the first comparison signal is at the first logic level and to output a second reference voltage as the second threshold voltage if the first comparison signal is at the second logic level, the second reference voltage being different from the first reference voltage; a second comparator configured to receive the second threshold voltage and the second terminal voltage and to generate a second comparison signal based at least in part on the second threshold voltage and the second terminal voltage, the second comparator being further configured to generate the second comparison signal at a third logic level if the second threshold voltage is larger than the second terminal voltage and to generate the second comparison signal at a fourth logic level if the second threshold voltage is smaller than the second terminal voltage, the fourth logic level being different from the third logic level; and a second switch configured to receive the first terminal voltage and the second comparison signal, the second switch being further configured to be closed to allow a current to flow out of the second terminal through the second switch if the second comparison signal is at the third logic level; wherein the comparator input voltage is related to the first terminal voltage.

According to certain embodiments, a method for a power converter includes: receiving a first terminal voltage; receiving a second terminal voltage; receiving the second terminal voltage and a first threshold voltage; generating a comparison signal based at least in part on the second terminal voltage and the first threshold voltage; receiving the first terminal voltage and the comparison signal; and if the comparison signal is at a first logic level, closing a switch to allow a current to flow through the switch; wherein the receiving the second terminal voltage and a first threshold voltage includes: receiving a first reference voltage as the first threshold voltage if the first terminal voltage is smaller than a second threshold voltage; and receiving a second reference voltage as the first threshold voltage if the first terminal voltage is larger than the second threshold voltage; wherein the first reference voltage is larger than the second reference voltage; wherein the generating a comparison signal based at least in part on the second terminal voltage and the first threshold voltage includes: generating the comparison signal at the first logic level if the first threshold voltage is larger than the second terminal voltage; and generating the comparison signal at a second logic level if the first threshold voltage is smaller than the second terminal voltage; wherein the second logic level is different from the first logic level.

According to some embodiments, a method for a power converter includes: receiving a first terminal voltage; receiving a second terminal voltage; receiving a first threshold voltage and a comparator input voltage; and generating a first comparison signal based at least in part on the first threshold voltage and the comparator input voltage. For example, the generating a first comparison signal based at least in part on the first threshold voltage and the comparator input voltage includes: generating the first comparison signal at a first logic level if the first threshold voltage is larger than the comparator input voltage; and generating the first comparison signal at a second logic level if the first threshold voltage is smaller than the comparator input voltage, the second logic level being different from the first logic level. In some examples, the method also includes: receiving the first comparison signal; and outputting a second threshold voltage based at least in part on the first comparison signal. For example, the outputting a second threshold voltage based at least in part on the first comparison signal includes: outputting a first reference voltage as the second threshold voltage if the first comparison signal is at the first logic level; and outputting a second reference voltage as the second threshold voltage if the first comparison signal is at the second logic level, the second reference voltage being different from the first reference voltage. In certain examples, the method also includes: receiving the second threshold voltage and the second terminal voltage; and generating a second comparison signal based at least in part on the second threshold voltage and the second terminal voltage. For example, the generating a second comparison signal based at least in part on the second threshold voltage and the second terminal voltage includes: generating the second comparison signal at a third logic level if the second threshold voltage is larger than the second terminal voltage; and generating the second comparison signal at a fourth logic level if the second threshold voltage is smaller than the second terminal voltage, the fourth logic level being different from the third logic level. In some examples, the method also includes: receiving the first terminal voltage and the second comparison signal; and if the second comparison signal is at the third logic level, closing a switch to allow a current to flow through the switch. For example, the comparator input voltage is related to the first terminal voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 8B is a simplified timing diagram for the power converter as shown in FIG. 8A according to some embodiments of the present invention.

FIG. 10B is a simplified timing diagram for the power converter as shown in FIG. 10A according to some embodiments of the present invention.

5. DETAILED DESCRIPTION OF THE INVENTION

Certain embodiments of the present invention are directed to integrated circuits. More particularly, some embodiments of the invention provide systems and methods for reducing power loss of power converters. Merely by way of example, some embodiments of the invention have been applied to power converters with high voltage supplies. But it would be recognized that the invention has a much broader range of applicability.

Figure 1:
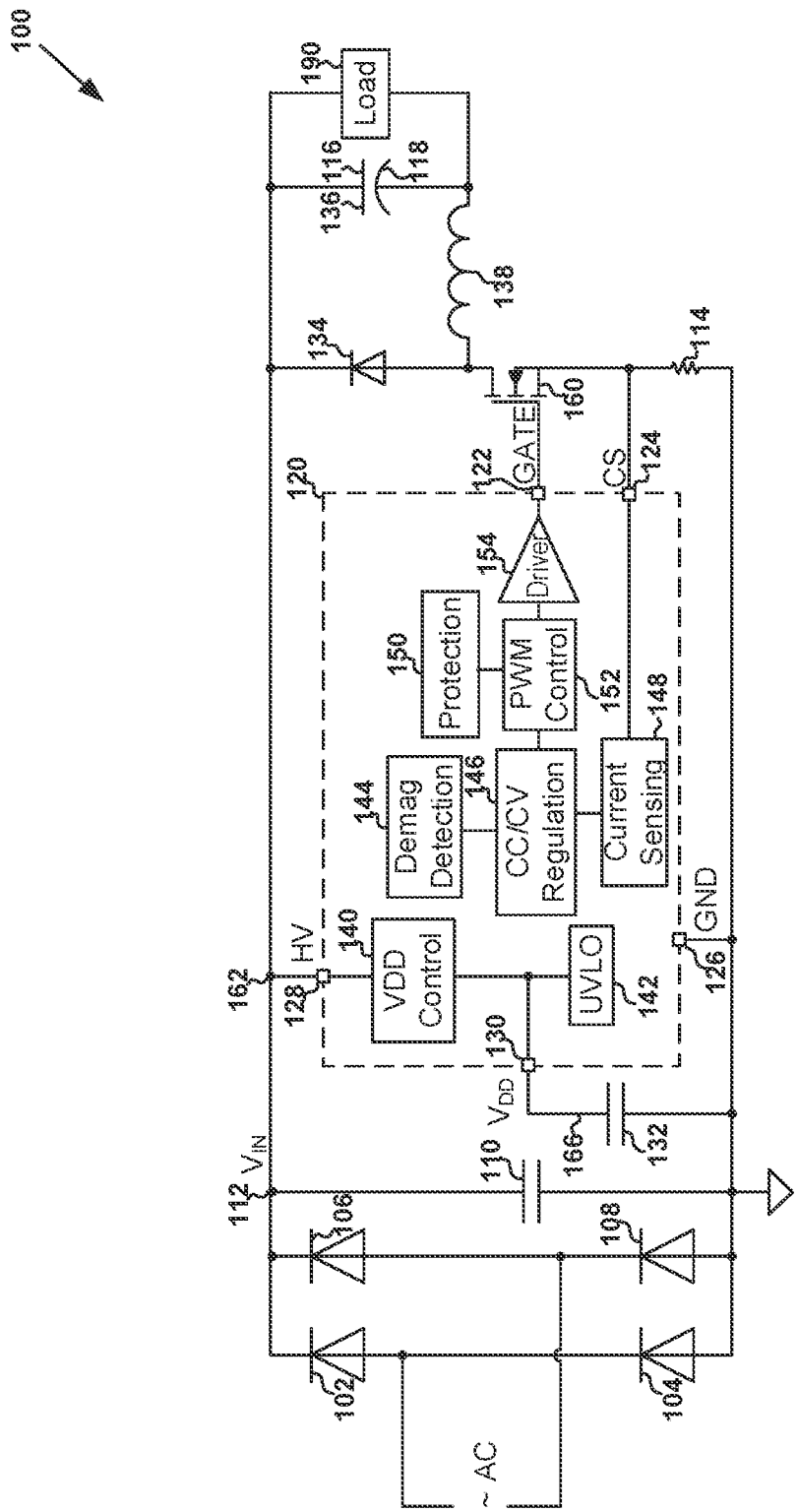
FIG. 1 is a simplified diagram showing a conventional AC-to-DC power converter.
Figure 2:
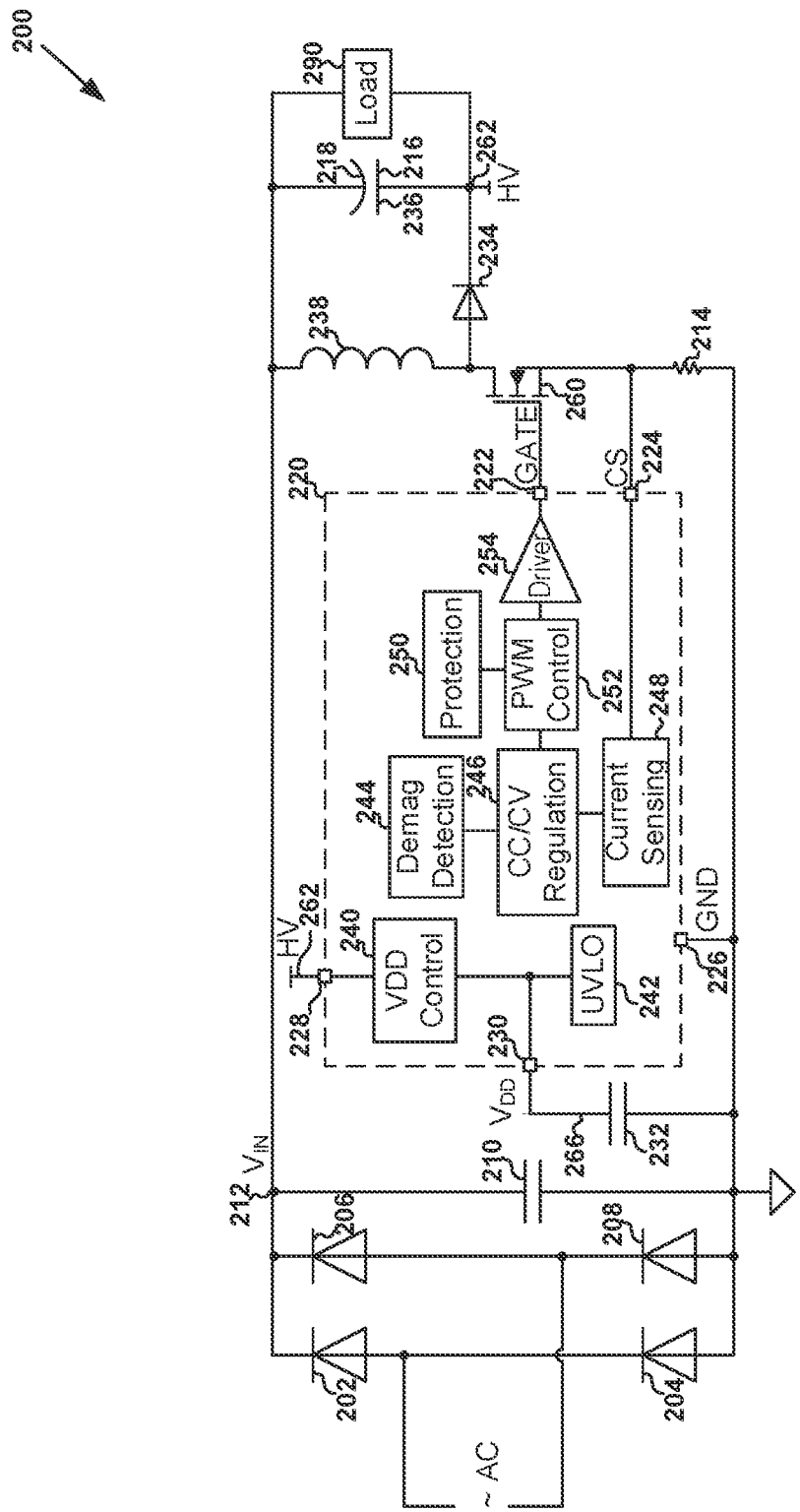
FIG. 2 is a simplified diagram showing another conventional AC-to-DC power converter.
Figure 3:
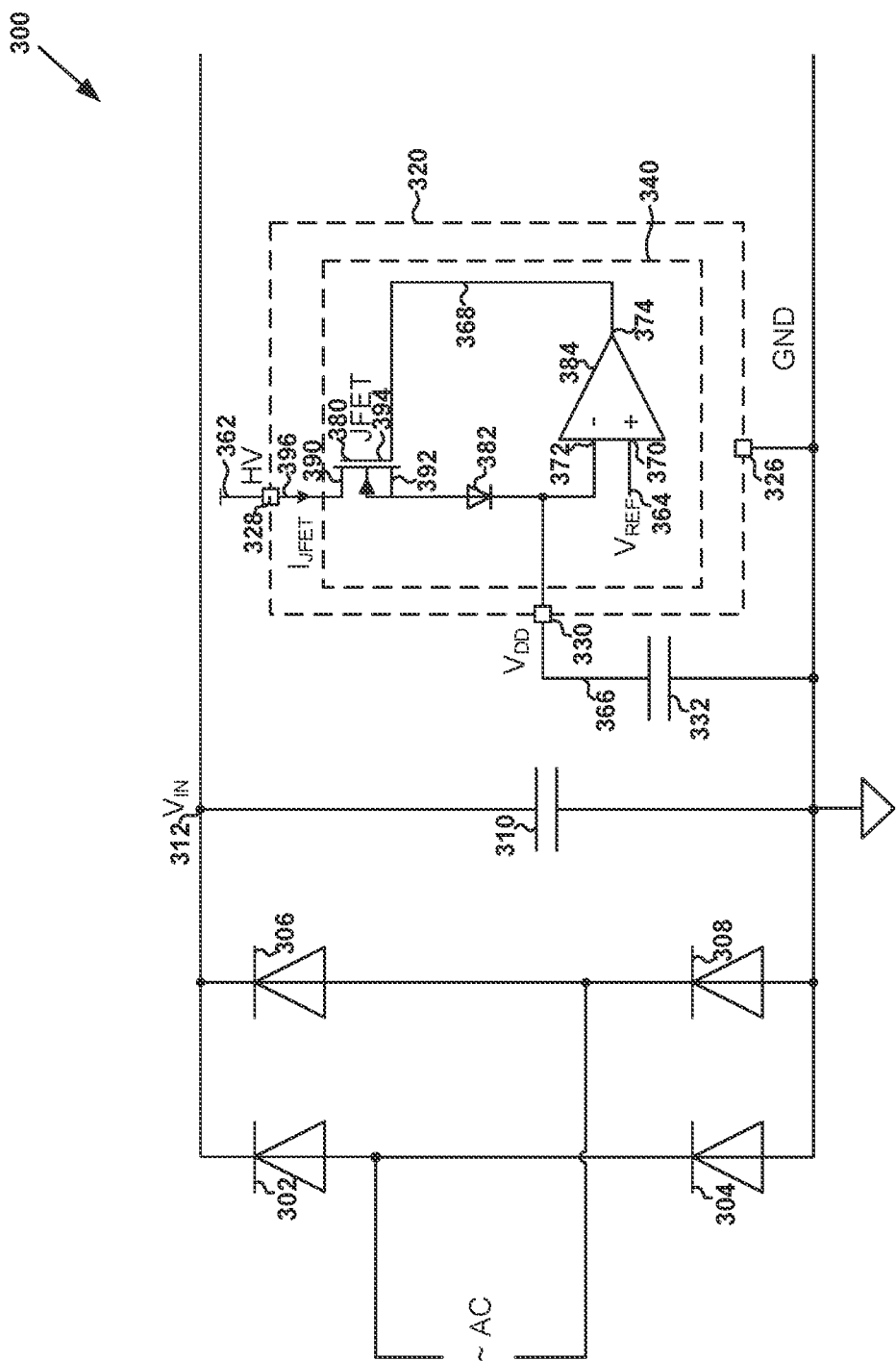
FIG. 3 is a simplified diagram showing at least certain components of a conventional AC-to-DC power converter.
Figure 4:
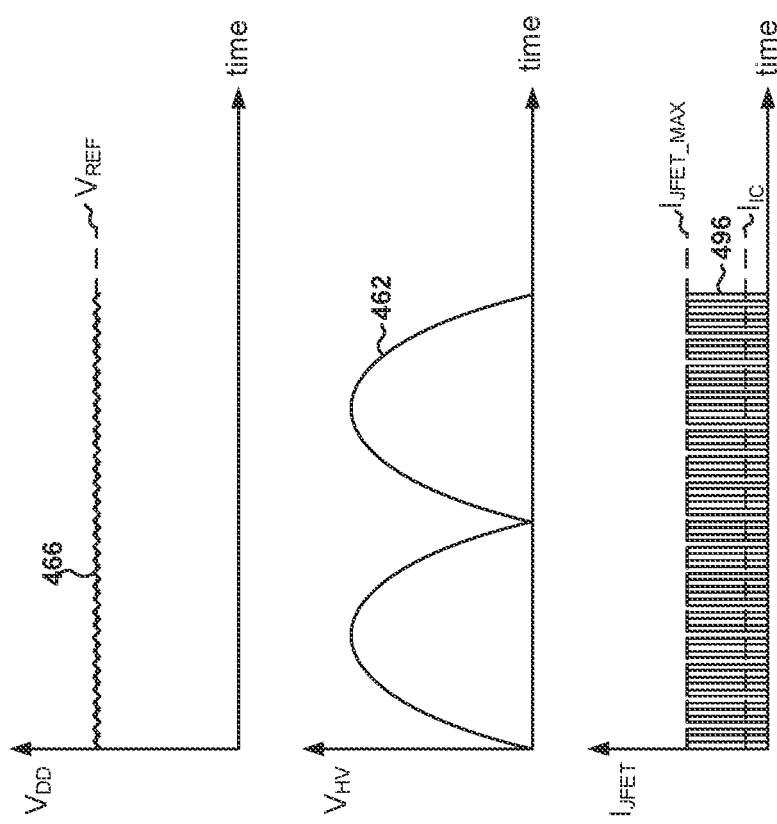
FIG. 4 is a simplified timing diagram for the power converter as shown in FIG. 3 according to certain embodiments.

FIG. 4 is a simplified timing diagram for the power converter 300 as shown in FIG. 3 according to certain embodiments. The waveform 466 represents the voltage 366 (e.g., $V_{DD}$) as a function of time, the waveform 462 represents the voltage 362 (e.g., $V_{HV}$) as a function of time, and the waveform 496 represents the current 396 (e.g., $I_{JFET}$) as a function of time. For example, the power converter 300 is the power converter 100, and the voltage 362 (e.g., $V_{HV}$) is equal to the voltage 312 (e.g., $V_{IN}$).

In some examples, as shown by the waveform 466, the voltage 366 (e.g., $V_{DD}$) is regulated around the voltage 364 (e.g., $V_{REF}$). In certain examples, as shown by the waveform 496, the maximum magnitude of the current 396 (e.g., $I_{JFET}$) is equal to the maximum current (e.g., $I_{JFET\_MAX}$) that the junction-gate field-effect transistor (JFET) 380 can provide. In some examples, the average magnitude of the current 396 (e.g., $I_{JFET}$) is equal to an operating current (e.g., $I_{IC}$) of the controller 320 (e.g., a chip).

According to some embodiments, as shown in FIG. 4, when the JFET 380 is turned on, the voltage drop from the drain terminal 390 to the source terminal 392 is large. For example, the power loss caused by this voltage drop is approximately:

$$P_{HV\_Loss} \approx \frac{2\sqrt{2}}{\pi} \times V_{HV} \times I_{IC} \qquad \text{(Equation 1)}$$

where $P_{HV\_Loss}$ represents the power loss caused by the voltage drop from the drain terminal 390 to the source terminal 392. Additionally, $V_{HV}$ represents the voltage 362, and $I_{IC}$ represents an operating current of the controller 320, which is equal to the average magnitude of the current 396 according to certain embodiments.

In some embodiments, as shown by Equation 1, if $V_{HV}$ increases, $P_{HV\_Loss}$ also increases. For example, the power loss caused by the voltage drop from the drain terminal 390 to the source terminal 392 is converted to heat, which increases the temperature of the controller 320 (e.g., a chip) and decreases the system efficiency of the power converter 300.

Figure 5:
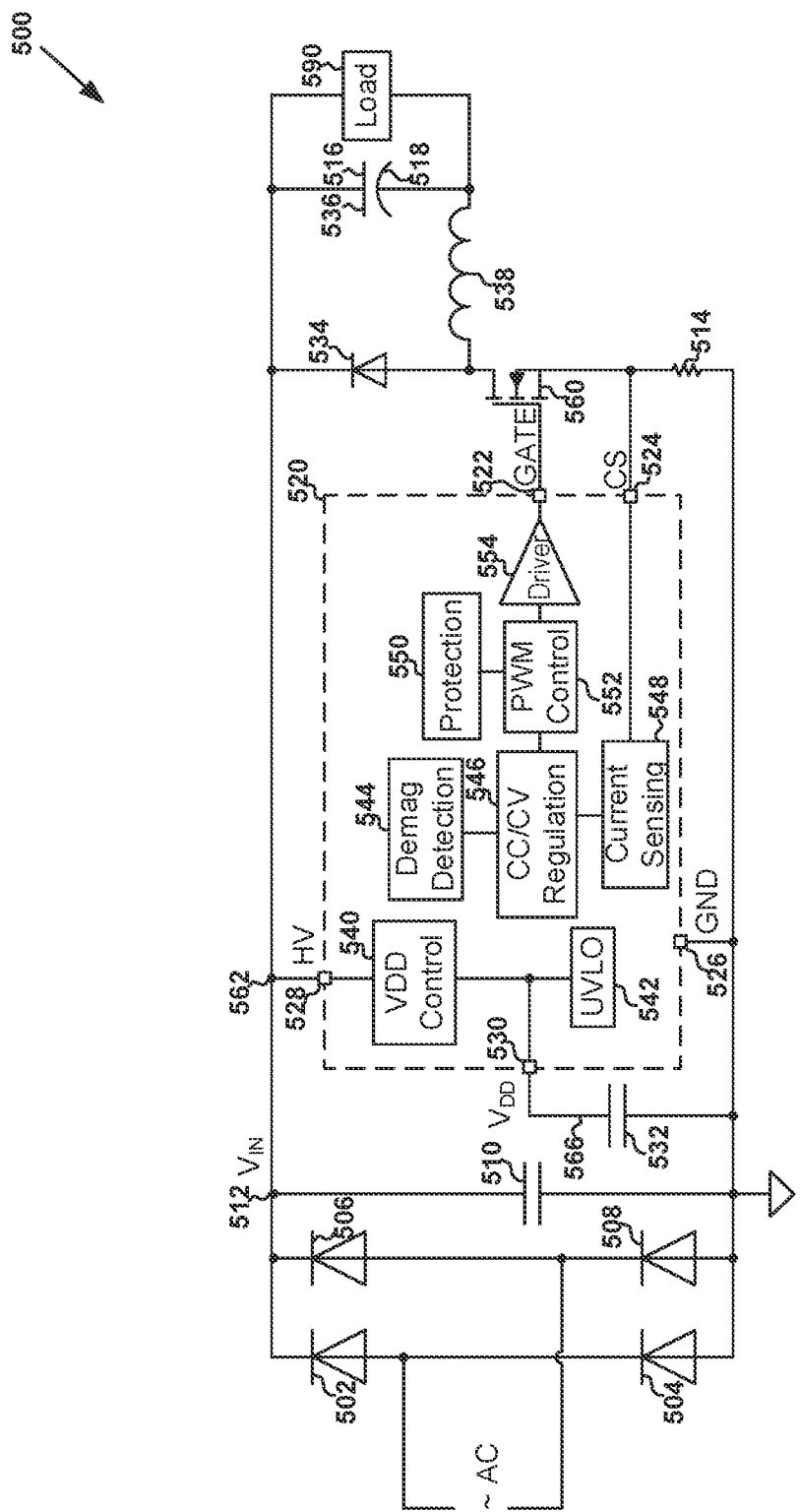
FIG. 5 is a simplified diagram showing an AC-to-DC power converter according to some embodiments of the present invention.

FIG. 5 is a simplified diagram showing an AC-to-DC power converter according to some embodiments of the present invention. This diagram is merely an example, which should not unduly limit the scope of the claims. One of ordinary skill in the art would recognize many variations, alternatives, and modifications. The power converter 500 includes diodes 502, 504, 506, 508 and 534, capacitors 510, 532 and 536, a resistor 514, a controller 520, an inductor 538, and a switch 560. The controller 520 (e.g., a chip) includes terminals 522, 524, 526, 528 and 530 (e.g., pins). Additionally, the controller 520 (e.g., a chip) includes a voltage control component 540 (e.g., a VDD control component), an undervoltage-lockout component 542 (e.g., a UVLO component), a demagnetization-detection component 544, a constant-current and/or constant-voltage regulation component 546 (e.g., a CC/CV regulation component), a current sensing component 548, a protection component 550, a modulation control component 552, and a driver 554. Moreover, the capacitor 536 includes terminals 516 and 518. For example, the power converter 500 is an AC-to-DC buck converter.

In some examples, the switch 560 is a transistor. In certain examples, the modulation control component 552 is a pulse-width-modulation (PWM) control component. According to some embodiments, the power converter 500 provides an output current and/or an output voltage to a load 590. According to certain embodiments, the capacitor 536 is a polarized capacitor that includes the anode terminal 516 and the cathode terminal 518, and the anode terminal 516 is connected to the terminal 528.

Figure 7:
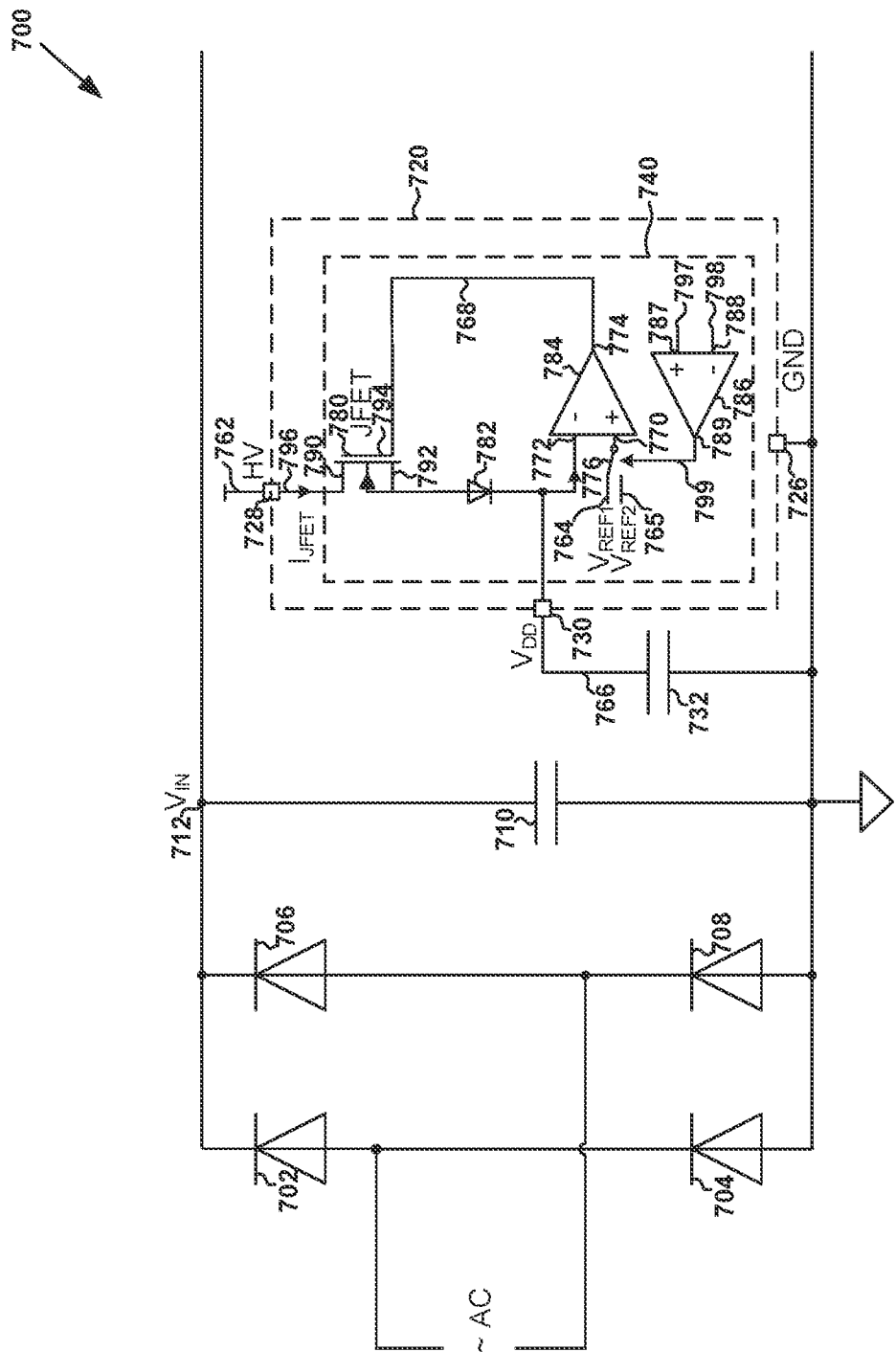
FIG. 7 is a simplified diagram showing at least certain components of an AC-to-DC power converter according to some embodiments of the present invention.

As shown in FIG. 5, the capacitor 532 provides a voltage 566 (e.g., $V_{DD}$) to the controller 520 through the terminal 530, and the controller 520 also receives a voltage 562 (e.g., $V_{HV}$) at the terminal 528 according to some embodiments. For example, the capacitor 510 provides a voltage 512 (e.g., $V_{IN}$), which is equal to the voltage 562, and the anode terminal 516 of the polarized capacitor 536 is also biased at the voltage 562. As an example, the voltage control component 540 is implemented according to a voltage control component 740 as shown in FIG. 7.

Figure 6:
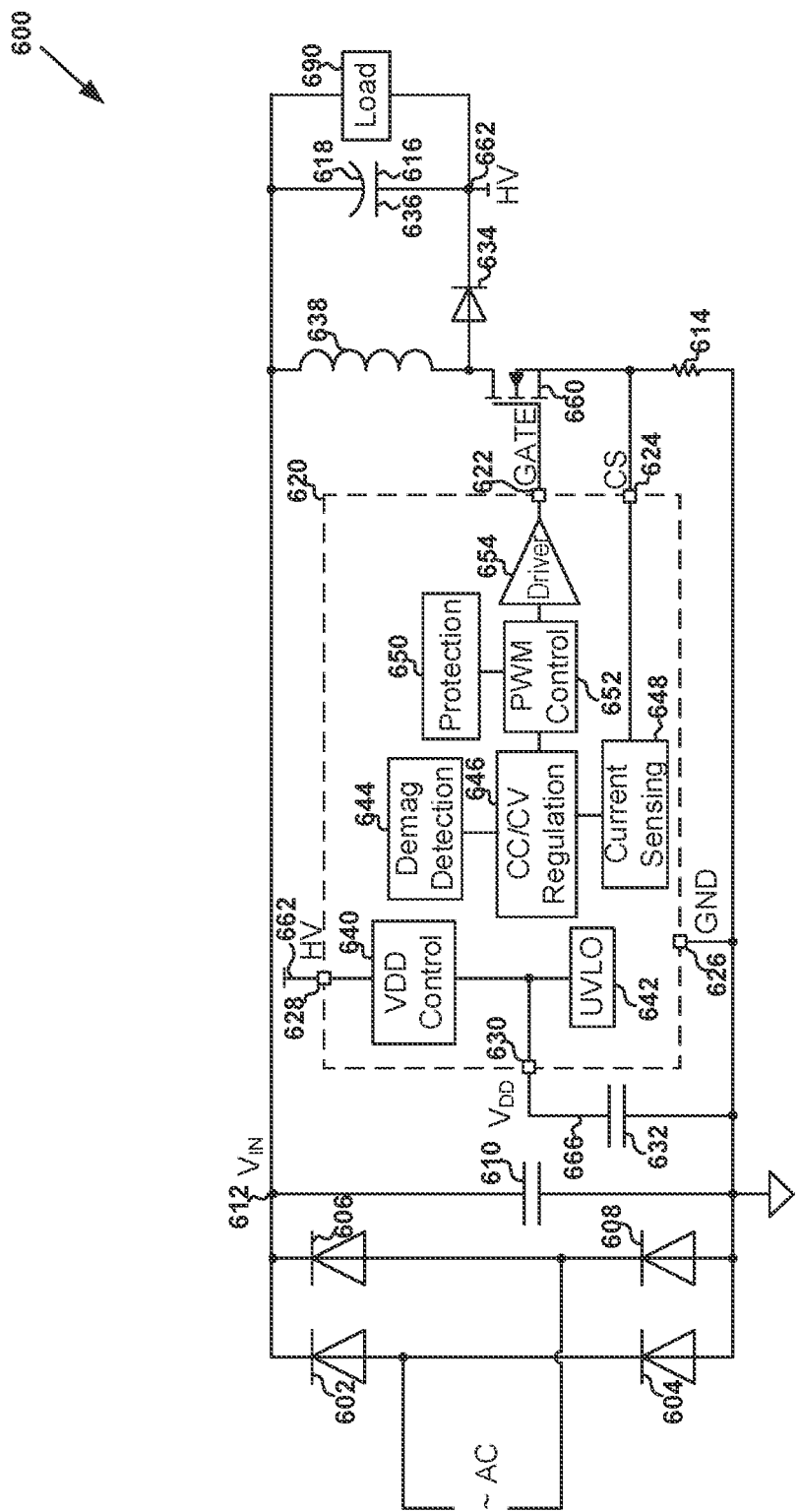
FIG. 6 is a simplified diagram showing an AC-to-DC power converter according to certain embodiments of the present invention.

FIG. 6 is a simplified diagram showing an AC-to-DC power converter according to certain embodiments of the present invention. This diagram is merely an example, which should not unduly limit the scope of the claims. One of ordinary skill in the art would recognize many variations, alternatives, and modifications. The power converter 600 includes diodes 602, 604, 606, 608 and 634, capacitors 610, 632 and 636, a resistor 614, a controller 620, an inductor 638, and a switch 660. The controller 620 (e.g., a chip) includes terminals 622, 624, 626, 628 and 630 (e.g., pins). Additionally, the controller 620 (e.g., a chip) includes a voltage control component 640 (e.g., a VDD control component), an undervoltage-lockout component 642 (e.g., a UVLO component), a demagnetization-detection component 644, a constant-current and/or constant-voltage regulation component 646 (e.g., a CC/CV regulation component), a current sensing component 648, a protection component 650, a modulation control component 652, and a driver 654. Moreover, the capacitor 636 includes terminals 616 and 618. For example, the power converter 600 is an AC-to-DC buck-boost converter.

In some examples, the switch 660 is a transistor. In certain examples, the modulation control component 652 is a pulse-width-modulation (PWM) control component. According to some embodiments, the power converter 600 provides an output current and/or an output voltage to a load 690. According to certain embodiments, the capacitor 636 is a polarized capacitor that includes the anode terminal 616 and the cathode terminal 618, and the anode terminal 616 is connected to the terminal 628.

As shown in FIG. 6, the capacitor 632 provides a voltage 666 (e.g., $V_{DD}$) to the controller 620 through the terminal 630, and the controller 620 also receives a voltage 662 at the terminal 628 according to some embodiments. In some examples, the capacitor 610 provides a voltage 612 (e.g., $V_{IN}$), and the anode terminal 616 of the polarized capacitor 636 is biased at the voltage 662. As an example, the voltage control component 640 is implemented according to the voltage control component 740 as shown in FIG. 7.

FIG. 7 is a simplified diagram showing at least certain components of an AC-to-DC power converter according to some embodiments of the present invention. This diagram is merely an example, which should not unduly limit the scope of the claims. One of ordinary skill in the art would recognize many variations, alternatives, and modifications. Certain components of the power converter 700 include diodes 702, 704, 706 and 708, capacitors 710 and 732, and a controller 720. Certain components of the controller 720

(e.g., a chip) include terminals 726, 728 and 730 (e.g., pins), and the voltage control component 740 (e.g., a VDD control component). As shown in FIG. 7, the voltage control component 740 includes a switch 776, a junction-gate field-effect transistor (JFET) 780, a diode 782, and comparators 784 and 786. In certain examples, the power converter 700 is the power converter 500, which for example is an AC-to-DC buck converter. In some examples, the power converter 700 is the power converter 600, which for example is an AC-to-DC buck-boost converter.

As shown in FIG. 7, the JFET 780 includes a drain terminal 790, a source terminal 792, and a gate terminal 794, the comparator 784 includes input terminals 770 and 772 and an output terminal 774, and the comparator 786 includes input terminals 787 and 788 and an output terminal 789, according to certain embodiments. In some examples, the capacitor 732 provides a voltage 766 (e.g., $V_{DD}$) to the controller 720 through the terminal 730, and the controller 720 also receives a voltage 762 (e.g., $V_{HV}$) at the terminal 728. In certain examples, the capacitor 710 provides a voltage 712 (e.g., $V_{IN}$).

According to some embodiments, the power converter 700 is the same as the power converter 500. In some examples, the diodes 702, 704, 706, and 708 are the same as the diodes 502, 504, 506, and 508 respectively, the capacitors 710 and 732 are the same as the capacitors 510 and 532 respectively, and the controller 720 is the same as the controller 520. In certain examples, the terminals 726, 728, and 730 are the same as the terminals 526, 528, and 530 respectively, and the voltage control component 740 is the same as the voltage control component 540. In some examples, the voltage 766 (e.g., $V_{DD}$) is the same as the voltage 566 (e.g., $V_{DD}$), the voltage 762 is the same as the voltage 562, and the voltage 712 (e.g., $V_{IN}$) is the same as the voltage 512 (e.g., $V_{IN}$).

According to certain embodiments, the power converter 700 is the same as the power converter 600. In some examples, the diodes 702, 704, 706, and 708 are the same as the diodes 602, 604, 606, and 608 respectively, the capacitors 710 and 732 are the same as the capacitors 610 and 632 respectively, and the controller 720 is the same as the controller 620. In certain examples, the terminals 726, 728, and 730 are the same as the terminals 626, 628, and 630 respectively, and the voltage control component 740 is the same as the voltage control component 640. In some examples, the voltage 766 (e.g., $V_{DD}$) is the same as the voltage 666 (e.g., $V_{DD}$), the voltage 762 is the same as the voltage 662, and the voltage 712 (e.g., $V_{IN}$) is the same as the voltage 612 (e.g., $V_{IN}$).

In some embodiments, the comparator 786 receives a signal 797 (e.g., $V_{TH}$) at the input terminal 787, receives a signal 798 (e.g., $V_{REP}$) at the input terminal 788, and outputs a signal 799 at the output terminal 789. In certain examples, if the signal 797 (e.g., $V_{TH}$) is larger than the signal 798 (e.g., $V_{REP}$), the signal 799 is at the logic high level. In some examples, if the signal 797 (e.g., $V_{TH}$) is smaller than the signal 798 (e.g., $V_{REP}$), the signal 799 is at the logic low level. In certain embodiments, the signal 799 is received by the switch 776. In some examples, if the signal 799 is at the logic high level, the switch 776 connects a voltage 764 (e.g., $V_{REF1}$) to the input terminal 770 of the comparator 784, and the comparator 784 receives the voltage 764 (e.g., $V_{REF1}$) to the input terminal 770. In certain examples, if the signal 799 is at the logic low level, the switch 776 connects a voltage 765 (e.g., $V_{REF2}$) to the input terminal 770 of the comparator 784, and the comparator 784 receives the voltage 765 (e.g., $V_{REF2}$) to the input terminal 770. In some examples, the comparator 784 also receives the voltage 766 (e.g., $V_{DD}$) at the terminal 772 and outputs a signal 768 at the terminal 774.

According to some embodiments, if the signal 799 is at the logic high level, the comparator 784 receives the voltage 764 (e.g., $V_{REF1}$) at the terminal 770, receives the voltage 766 (e.g., $V_{DD}$) at the terminal 772, and outputs the signal 768 at the terminal 774. For example, if the voltage 766 (e.g., $V_{DD}$) is smaller than the voltage 764 (e.g., $V_{REF1}$), the signal 768 is at the logic high level. In another example, if the voltage 766 (e.g., $V_{DD}$) is larger than the voltage 764 (e.g., $V_{REF1}$), the signal 768 is at the logic low level. In certain examples, the voltage 766 (e.g., $V_{DD}$) is provided by the capacitor 732 through the terminal 730, and the signal 768 is received by the gate terminal 794 of the JFET 780. In some examples, the voltage control component 740 is configured to keep the voltage 766 (e.g., $V_{DD}$) stable around the voltage 764 (e.g., $V_{REF1}$). For example, the voltage 766 (e.g., $V_{DD}$) is regulated around the voltage 764 (e.g., $V_{REF1}$).

According to certain embodiments, if the signal 799 is at the logic low level, the comparator 784 receives the voltage 765 (e.g., $V_{REF2}$) at the terminal 770, receives the voltage 766 (e.g., $V_{DD}$) at the terminal 772, and outputs the signal 768 at the terminal 774. For example, if the voltage 766 (e.g., $V_{DD}$) is smaller than the voltage 765 (e.g., $V_{REF2}$), the signal 768 is at the logic high level. In another example, if the voltage 766 (e.g., $V_{DD}$) is larger than the voltage 765 (e.g., $V_{REF2}$), the signal 768 is at the logic low level. In certain examples, the voltage 766 (e.g., $V_{DD}$) is provided by the capacitor 732 through the terminal 730, and the signal 768 is received by the gate terminal 794 of the JFET 780. In some examples, the voltage control component 740 is configured to keep the voltage 766 (e.g., $V_{DD}$) stable around the voltage 765 (e.g., $V_{REF2}$). For example, the voltage 766 (e.g., $V_{DD}$) is regulated around the voltage 765 (e.g., $V_{REF2}$).

According to some embodiments, if the signal 768 is at the logic high level, the JFET 780 is turned on by the signal 768. In some examples, when the JFET 780 is turned on, a current 796 (e.g., $I_{JFET}$) has a magnitude that is larger than zero, and the current 796 flows through the JFET 780, the diode 782 and the terminal 730 and charges the capacitor 732 to raise the voltage 766 (e.g., $V_{DD}$). According to certain embodiments, if the signal 768 is at the logic low level, the JFET 780 is turned off by the signal 768. In certain examples, when the JFET 780 is turned off, the current 796 (e.g., $I_{JFET}$) has a magnitude that is equal to zero, and the current 796 does not charge the capacitor 732.

As shown in FIG. 7, the signal 798 (e.g., $V_{REP}$) is generated to represent the voltage 762 (e.g., $V_{HV}$) in magnitude according to certain embodiments. In some embodiments, the signal 798 (e.g., $V_{REP}$) is proportional (e.g., directly proportional) to the voltage 762 (e.g., $V_{HV}$) in magnitude, and the voltage 765 (e.g., $V_{REF2}$) is smaller than the voltage 764 (e.g., $V_{REF1}$). For example, the signal 798 (e.g., $V_{REP}$) increases with the increasing voltage 762 (e.g., $V_{HV}$) in magnitude, and decreases with the decreasing voltage 762 (e.g., $V_{HV}$) in magnitude, and the voltage 765 (e.g., $V_{REF2}$) is smaller than the voltage 764 (e.g., $V_{REF1}$). In certain embodiments, the voltage 798 (e.g., $V_{REP}$) is inversely proportional to the voltage 762 (e.g., $V_{HV}$) in magnitude, and the voltage 765 (e.g., $V_{REF2}$) is larger than the voltage 764 (e.g., $V_{REF1}$). For example, the signal 798 (e.g., $V_{REP}$) increases with the decreasing voltage 762 (e.g., $V_{HV}$) in magnitude, and decreases with the increasing voltage 762 (e.g., $V_{HV}$) in magnitude, and the voltage 765 (e.g., $V_{REF2}$) is larger than the voltage 764 (e.g., $V_{REF1}$).

Figure 8A:
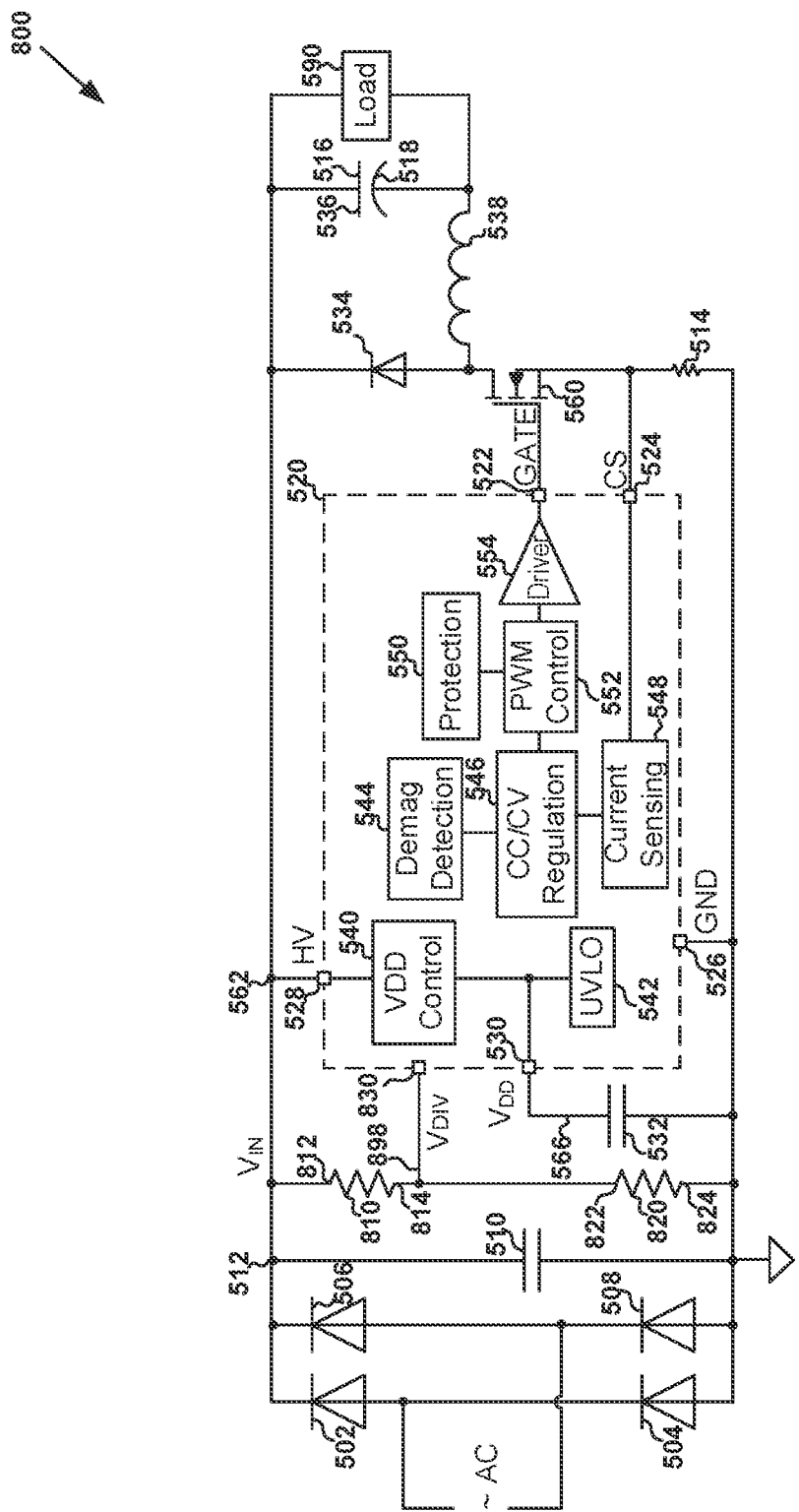
FIG. 8A is a simplified diagram showing an AC-to-DC power converter according to certain embodiments of the present invention.

In some embodiments, the signal 798 (e.g., $V_{RP}$) is generated by at least a voltage divider, and is proportional (e.g., directly proportional) to the voltage 762 (e.g., $V_{HV}$) in magnitude, as shown, for example, by FIG. 8A and/or FIG. 8B. In certain embodiments, the signal 798 (e.g., $V_{REP}$) is generated by at least a current sensing resistor, and is proportional (e.g., directly proportional) to the voltage 762 (e.g., $V_{HV}$) in magnitude, as shown, for example, by FIG. 9A and/or FIG. 9B. In some embodiments, the signal 798 (e.g., $V_{REP}$) is generated by at least an auxiliary winding, and is proportional (e.g., directly proportional) to the voltage 762 (e.g., $V_{HV}$) in magnitude, as shown, for example, by FIG. 10A and/or FIG. 10B. In certain embodiments, the signal 798 (e.g., $V_{REP}$) is generated by at least a driver, and is inversely proportional to the voltage 762 (e.g., $V_{HV}$) in magnitude, as shown, for example, by FIG. 11A and/or FIG. 11B.

FIG. 8A is a simplified diagram showing an AC-to-DC power converter according to certain embodiments of the present invention. This diagram is merely an example, which should not unduly limit the scope of the claims. One of ordinary skill in the art would recognize many variations, alternatives, and modifications. The power converter 800 includes the diodes 502, 504, 506, 508 and 534, the capacitors 510, 532 and 536, the resistor 514, the controller 520, the inductor 538, and the switch 560. The controller 520 (e.g., a chip) includes the terminals 522, 524, 526, 528 and 530 (e.g., pins). Additionally, the controller 520 (e.g., a chip) includes the voltage control component 540 (e.g., a VDD control component), the undervoltage-lockout component 542 (e.g., a UVLO component), the demagnetization-detection component 544, the constant-current and/or constant-voltage regulation component 546 (e.g., a CC/CV regulation component), the current sensing component 548, the protection component 550, the modulation control component 552, and the driver 554. Moreover, the capacitor 536 includes the terminals 516 and 518. In certain examples, the power converter 800 is the same as the power converter 500, and the power converter 500 is the same as the power converter 700. In some examples, the voltage control component 540 is the same as the voltage control component 740. For example, the power converter 800 is an AC-to-DC buck converter.

As shown in FIG. 8A, the power converter 800 also includes resistors 810 and 820, and the controller 520 (e.g., a chip) also includes a terminal 830 (e.g., a pin) according to some embodiments. In some examples, the resistor 810 includes terminals 812 and 814, and the resistor 820 includes terminals 822 and 824. In certain examples, the terminal 812 receives the voltage 512 (e.g., $V_{IN}$), which is equal to the voltage 562, and the terminal 814 is connected to the terminal 822. In some examples, the terminals 814 and 822 generate a voltage 898 (e.g., $V_{DIV}$), which is received by the controller 520 at the terminal 830 and is used by the controller 520 to generate the signal 798 (e.g., $V_{REP}$). For example, the signal 798 (e.g., $V_{REP}$) is the same as the voltage 898 (e.g., $V_{DIV}$).

FIG. 8B is a simplified timing diagram for the power converter 800 as shown in FIG. 8A according to some embodiments of the present invention. This diagram is merely an example, which should not unduly limit the scope of the claims. One of ordinary skill in the art would recognize many variations, alternatives, and modifications. The waveform 830 represents the voltage 562 (e.g., $V_{HV}$) as a function of time, and the waveform 840 represents the voltage 898 (e.g., $V_{DIV}$) as a function of time.

In certain embodiments, the voltage 562 (e.g., $V_{HV}$), which is equal to the voltage 512 (e.g., $V_{IN}$), changes with time, as shown by the waveform 830. In some embodiments, the voltage 898 (e.g., $V_{DIV}$) is proportional (e.g., directly proportional) to the voltage 562 (e.g., $V_{HV}$) in magnitude, and the voltage 898 (e.g., $V_{DIV}$) changes with time, as shown by the waveform 840, and the voltage 765 (e.g., $V_{REF2}$) is smaller than the voltage 764 (e.g., $V_{REF1}$). In some examples, the voltage 562 (e.g., $V_{HV}$) is the same as the voltage 762 (e.g., $V_{HV}$).

Figure 9A:
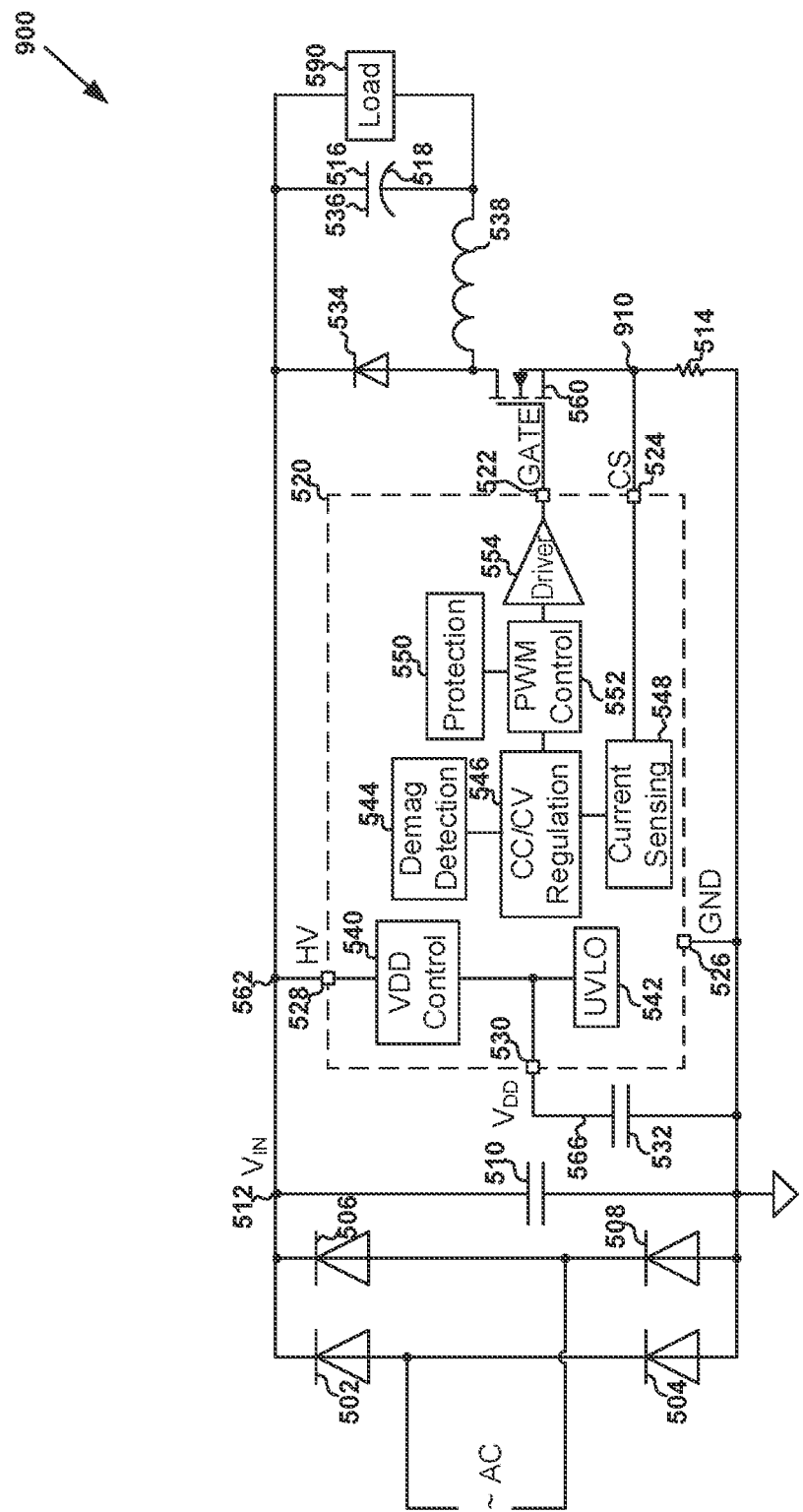
FIG. 9A is a simplified diagram showing an AC-to-DC power converter according to certain embodiments of the present invention.

FIG. 9A is a simplified diagram showing an AC-to-DC power converter according to certain embodiments of the present invention. This diagram is merely an example, which should not unduly limit the scope of the claims. One of ordinary skill in the art would recognize many variations, alternatives, and modifications. The power converter 900 includes the diodes 502, 504, 506, 508 and 534, the capacitors 510, 532 and 536, the resistor 514, the controller 520, the inductor 538, and the switch 560. The controller 520 (e.g., a chip) includes the terminals 522, 524, 526, 528 and 530 (e.g., pins). Additionally, the controller 520 (e.g., a chip) includes the voltage control component 540 (e.g., a VDD control component), the undervoltage-lockout component 542 (e.g., a UVLO component), the demagnetization-detection component 544, the constant-current and/or constant-voltage regulation component 546 (e.g., a CC/CV regulation component), the current sensing component 548, the protection component 550, the modulation control component 552, and the driver 554. Moreover, the capacitor 536 includes the terminals 516 and 518. In certain examples, the power converter 900 is the same as the power converter 500, and the power converter 500 is the same as the power converter 700. In some examples, the voltage control component 540 is the same as the voltage control component 740. As shown in FIG. 9A, the resistor 514 serves as a current sensing resistor, which generates a voltage 910 (e.g., $V_{CS}$). For example, the voltage 910 (e.g., $V_{CS}$) is received by the controller 520 at the terminal 524 and is used by the controller 520 to generate the signal 798 (e.g., $V_{REP}$) according to some embodiments. As an example, the power converter 900 is an AC-to-DC buck converter.

Figure 9B:
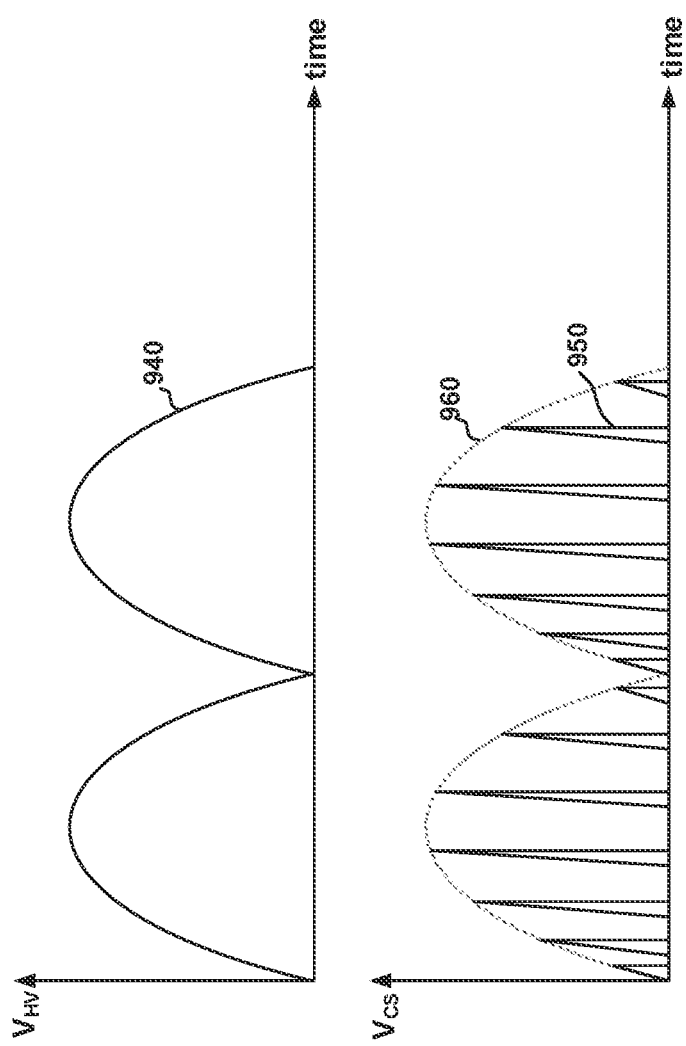
FIG. 9B is a simplified timing diagram for the power converter as shown in FIG. 9A according to some embodiments of the present invention.

FIG. 9B is a simplified timing diagram for the power converter 900 as shown in FIG. 9A according to some embodiments of the present invention. This diagram is merely an example, which should not unduly limit the scope of the claims. One of ordinary skill in the art would recognize many variations, alternatives, and modifications. The waveform 940 represents the voltage 562 (e.g., $V_{HV}$) as a function of time, the waveform 950 represents the voltage 910 (e.g., $V_{CS}$) as a function of time, and the waveform 960 represents the voltage 798 (e.g., $V_{REP}$) as a function of time. For example, the power converter 900 is an AC-to-DC buck converter, which operates in the quasi-resonant (QR) mode with constant on-time.

In certain embodiments, the voltage 562 (e.g., $V_{HV}$), which is equal to the voltage 512 (e.g., $V_{IN}$), changes with time, as shown by the waveform 940. In some embodiments, the voltage 910 (e.g., $V_{CS}$) reaches multiple peaks that correspond to multiple peak magnitudes respectively, and the multiple peak magnitudes change with time, as shown by the waveform 950. For example, the multiple peak magnitudes of the voltage 910 (e.g., $V_{CS}$) are proportional (e.g., directly proportional) to the voltage 562 (e.g., $V_{HV}$) in magnitude, and the voltage 765 (e.g., $V_{REF2}$) is smaller than the voltage 764 (e.g., $V_{REF1}$). In certain embodiments, the voltage 798 (e.g., $V_{REP}$) changes with time, as shown by the waveform 960. For example, the waveform 960 is an envelope of the multiple peaks of the voltage 910 (e.g., $V_{CS}$). As an example, the voltage 798 (e.g., $V_{REP}$) is proportional (e.g., directly proportional) to the voltage 562 (e.g., $V_{HV}$) in magnitude, and the voltage 765 (e.g., $V_{REF2}$) is smaller than the voltage 764 (e.g., $V_{REF1}$). For example, the voltage 562 (e.g., $V_{HV}$) is the same as the voltage 762 (e.g., $V_{HV}$).

Figure 10A:
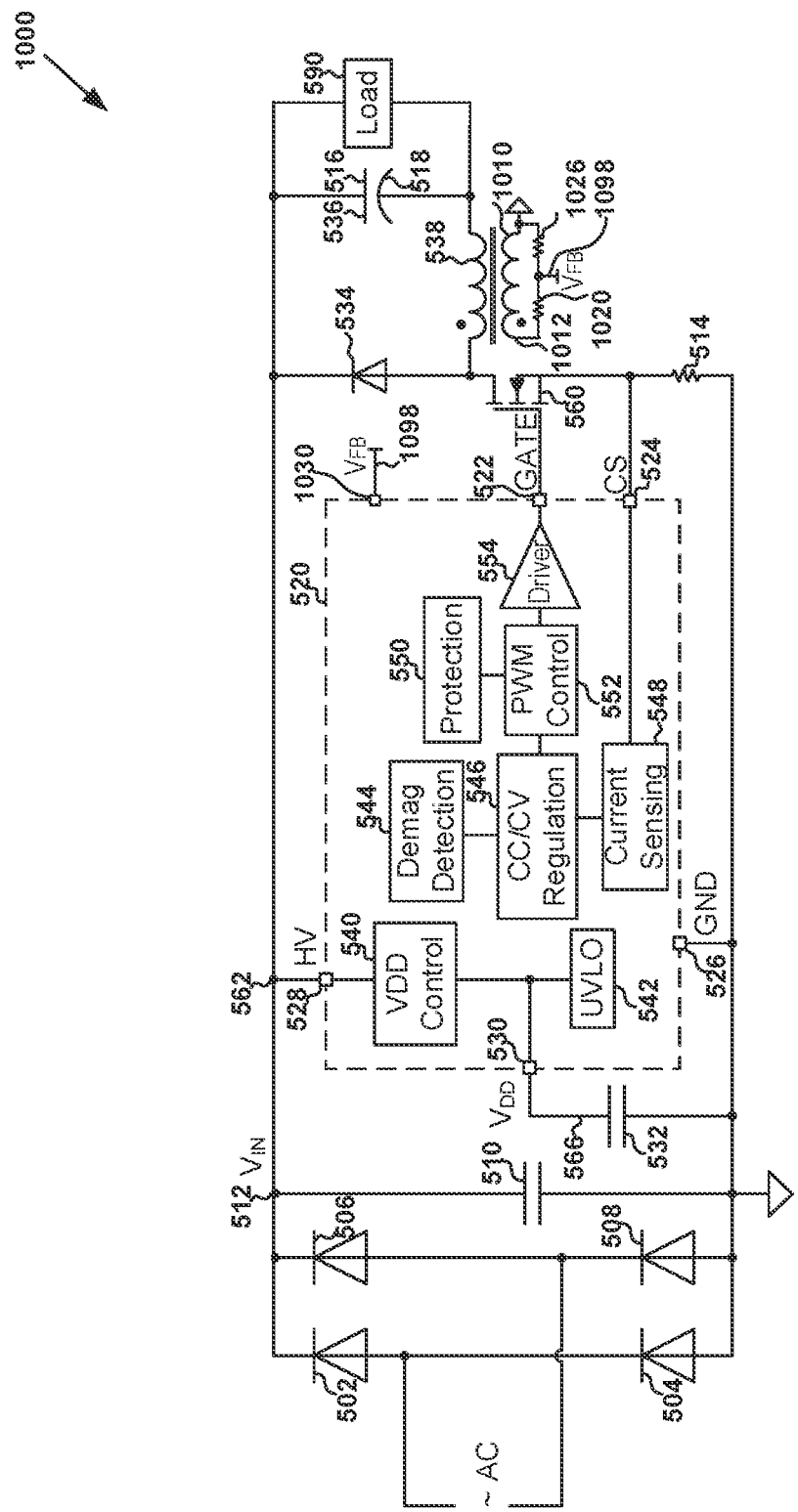
FIG. 10A is a simplified diagram showing an AC-to-DC power converter according to certain embodiments of the present invention.

FIG. 10A is a simplified diagram showing an AC-to-DC power converter according to certain embodiments of the present invention. This diagram is merely an example, which should not unduly limit the scope of the claims. One of ordinary skill in the art would recognize many variations, alternatives, and modifications. The power converter 1000 includes the diodes 502, 504, 506, 508 and 534, the capacitors 510, 532 and 536, the resistor 514, the controller 520, the inductor 538, and the switch 560. The controller 520 (e.g., a chip) includes the terminals 522, 524, 526, 528 and 530 (e.g., pins). Additionally, the controller 520 (e.g., a chip) includes the voltage control component 540 (e.g., a VDD control component), the undervoltage-lockout component 542 (e.g., a UVLO component), the demagnetization-detection component 544, the constant-current and/or constant-voltage regulation component 546 (e.g., a CC/CV regulation component), the current sensing component 548, the protection component 550, the modulation control component 552, and the driver 554. Moreover, the capacitor 536 includes the terminals 516 and 518. In certain examples, the power converter 1000 is the same as the power converter 500, and the power converter 500 is the same as the power converter 700. In some examples, the voltage control component 540 is the same as the voltage control component 740. For example, the power converter 1000 is an AC-to-DC buck converter.

As shown in FIG. 10A, the power converter 1000 also includes an inductor 1010, and resistors 1020 and 1026, and the controller 520 (e.g., a chip) also includes a terminal 1030 (e.g., a pin) according to some embodiments. In certain examples, the inductor 1010 serves as an auxiliary winding coupled to the inductor 538. For example, the auxiliary winding (e.g., the inductor 1010) generates a voltage 1012. In some examples, the resistors 1020 and 1026 are parts of a voltage divider, which is connected to the inductor 1010. For example, the voltage divider includes the resistors 1020 and 1026, and the voltage divider generates a voltage 1098 (e.g., $V_{FB}$), which is proportional (e.g., directly proportional) to the voltage 1012 in magnitude. In certain examples, the voltage 1098 (e.g., $V_{FB}$) is received by the controller 520 at the terminal 1030 and is used by the controller 520 to generate the signal 798 (e.g., $V_{REP}$).

FIG. 10B is a simplified timing diagram for the power converter 1000 as shown in FIG. 10A according to some embodiments of the present invention. This diagram is merely an example, which should not unduly limit the scope of the claims. One of ordinary skill in the art would recognize many variations, alternatives, and modifications. The waveform 1040 represents the voltage 562 (e.g., $V_{HV}$) as a function of time, the waveform 1050 represents the voltage 1098 (e.g., $V_{FB}$) as a function of time, and the waveform 1060 represents the voltage 798 (e.g., $V_{REP}$) as a function of time.

In certain embodiments, the voltage 562 (e.g., $V_{HV}$), which is equal to the voltage 512 (e.g., $V_{IN}$), changes with time, as shown by the waveform 1040. In some embodiments, the voltage 1098 (e.g., $V_{FB}$) reaches multiple valleys that correspond to multiple valley magnitudes respectively, and the multiple valley magnitudes change with time, as shown by the waveform 1050. For example, the multiple valley magnitudes of the voltage 1098 (e.g., $V_{FB}$) are proportional (e.g., directly proportional) to the voltage 562 (e.g., $V_{HV}$) in magnitude, and the voltage 765 (e.g., $V_{REF2}$) is smaller than the voltage 764 (e.g., $V_{REF1}$). In certain embodiments, the voltage 798 (e.g., $V_{REP}$) changes with time, as shown by the waveform 1060. For example, the waveform 1060 is an envelope of the multiple valleys of the voltage 1098 (e.g., $V_{FB}$). As an example, the voltage 798 (e.g., $V_{REP}$) is proportional (e.g., directly proportional) to the voltage 562 (e.g., $V_{HV}$) in magnitude, and the voltage 765 (e.g., $V_{REF2}$) is smaller than the voltage 764 (e.g., $V_{REF1}$). For example, the voltage 562 (e.g., $V_{HV}$) is the same as the voltage 762 (e.g., $V_{HV}$).

Figure 11A:
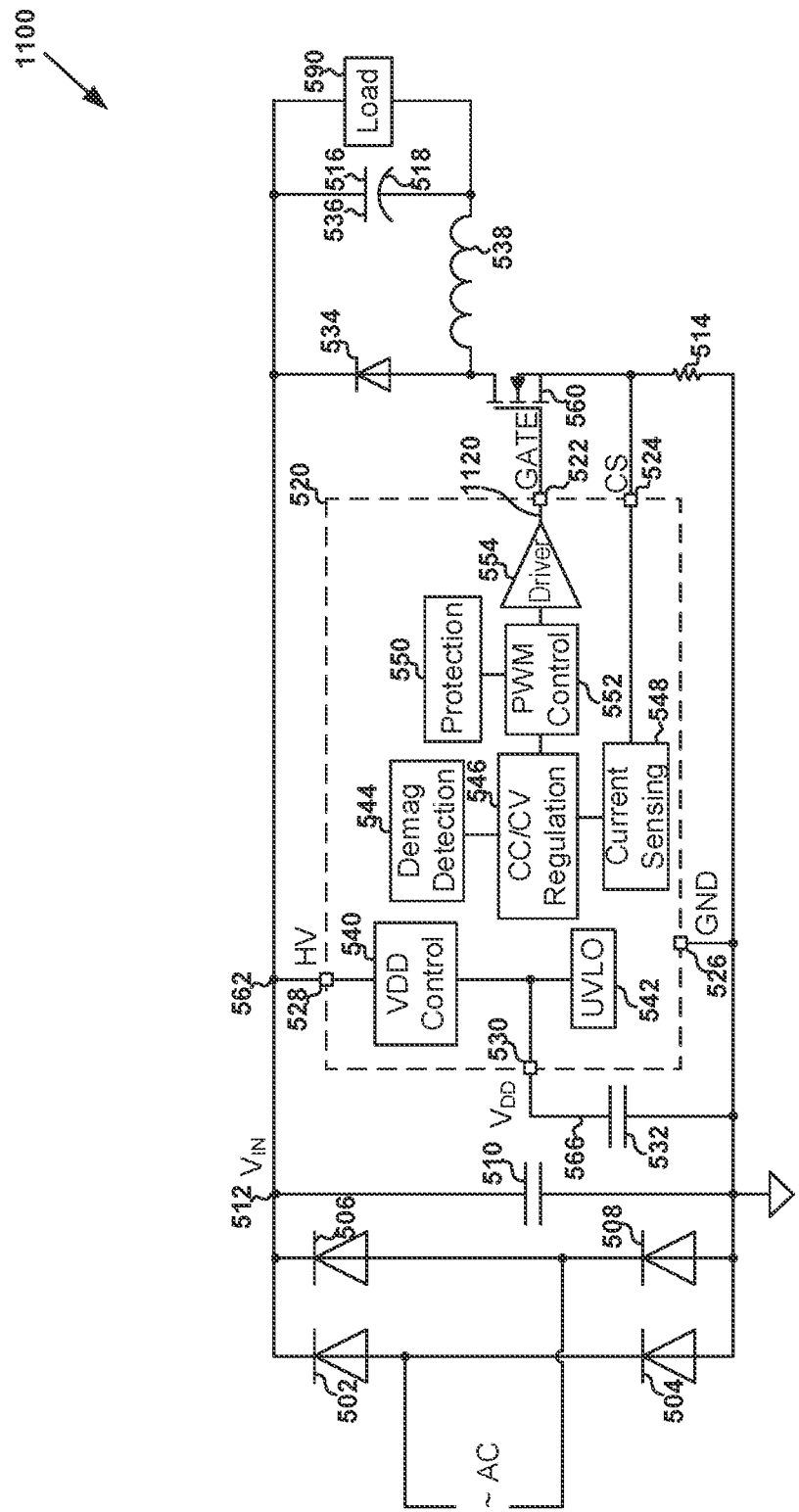
FIG. 11A is a simplified diagram showing an AC-to-DC power converter according to certain embodiments of the present invention.

FIG. 11A is a simplified diagram showing an AC-to-DC power converter according to certain embodiments of the present invention. This diagram is merely an example, which should not unduly limit the scope of the claims. One of ordinary skill in the art would recognize many variations, alternatives, and modifications. The power converter 1100 includes the diodes 502, 504, 506, 508 and 534, the capacitors 510, 532 and 536, the resistor 514, the controller 520, the inductor 538, and the switch 560. The controller 520 (e.g., a chip) includes the terminals 522, 524, 526, 528 and 530 (e.g., pins). Additionally, the controller 520 (e.g., a chip) includes the voltage control component 540 (e.g., a VDD control component), the undervoltage-lockout component 542 (e.g., a UVLO component), the demagnetization-detection component 544, the constant-current and/or constant-voltage regulation component 546 (e.g., a CC/CV regulation component), the current sensing component 548, the protection component 550, the modulation control component 552, and the driver 554. Moreover, the capacitor 536 includes the terminals 516 and 518. In certain examples, the power converter 1100 is the same as the power converter 500, and the power converter 500 is the same as the power converter 700. In some examples, the voltage control component 540 is the same as the voltage control component 740. As shown in FIG. 11A, the driver 554 generates a drive signal 1120 (e.g., $V_{GATE}$) according to some embodiments. In some examples, the drive signal 1120 (e.g., $V_{GATE}$) is sent to the switch 560 through the terminal 522. In certain examples, the drive signal 1120 (e.g., $V_{GATE}$) is used by the controller 520 to generate the signal 798 (e.g., $V_{REP}$). For example, the power converter 1100 is an AC-to-DC buck converter.

Figure 11B:
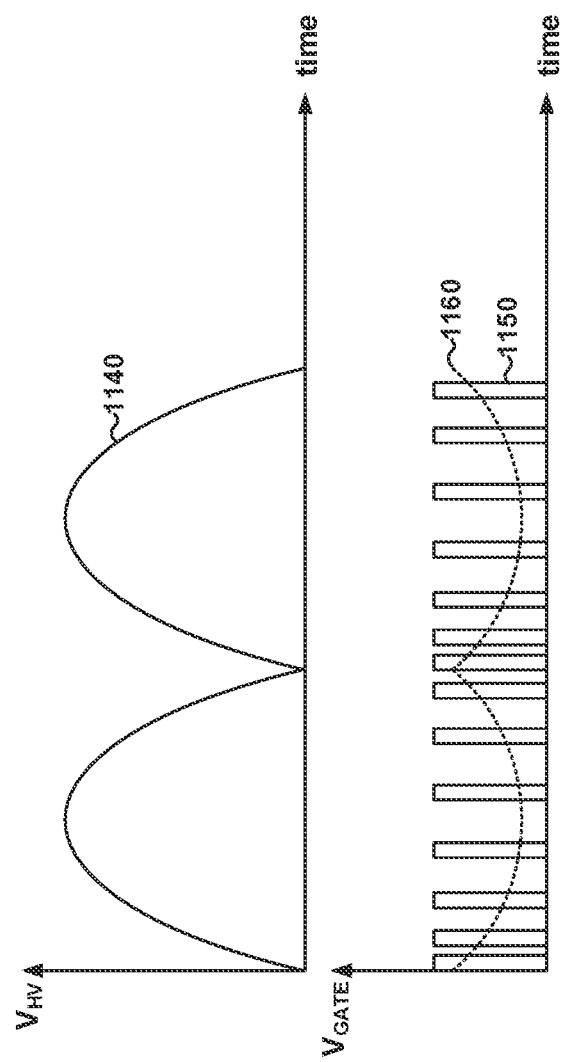
FIG. 11B is a simplified timing diagram for the power converter as shown in FIG. 11A according to some embodiments of the present invention.

FIG. 11B is a simplified timing diagram for the power converter 1100 as shown in FIG. 11A according to some embodiments of the present invention. This diagram is merely an example, which should not unduly limit the scope of the claims. One of ordinary skill in the art would recognize many variations, alternatives, and modifications. The waveform 1140 represents the voltage 562 (e.g., $V_{HV}$) as a function of time, the waveform 1150 represents the voltage 1120 (e.g., $V_{GATE}$) as a function of time, and the waveform 1160 represents the voltage 798 (e.g., $V_{REP}$) as a function of time. For example, the power converter 1100 is an AC-to-DC buck converter, which operates in the quasi-resonant (QR) mode.

In certain embodiments, the voltage 562 (e.g., $V_{HV}$), which is equal to the voltage 512 (e.g., $V_{IN}$), changes with time, as shown by the waveform 1140. In some embodiments, the voltage 1120 (e.g., $V_{GATE}$) changes between being at a logic high level and being at a logic low level, and the duty cycle of the voltage 1120 (e.g., $V_{GATE}$) changes with time, as shown by the waveform 1150. In certain embodiments, the voltage 798 (e.g., $V_{REP}$) changes with time, as shown by the waveform 1160. In some examples, the magnitude of the voltage 798 (e.g., $V_{REP}$) is proportional (e.g., directly proportional) to the duty cycle of the voltage 1120 (e.g., $V_{GATE}$) at the same time. In certain examples, the voltage 798 (e.g., $V_{REP}$) is inversely proportional to the voltage 562 (e.g., $V_{HV}$) in magnitude, and the voltage 765 (e.g., $V_{REF2}$) is larger than the voltage 764 (e.g., $V_{REF1}$). In some examples, the voltage 562 (e.g., $V_{HV}$) is the same as the voltage 762 (e.g., $V_{HV}$).

Figure 12:
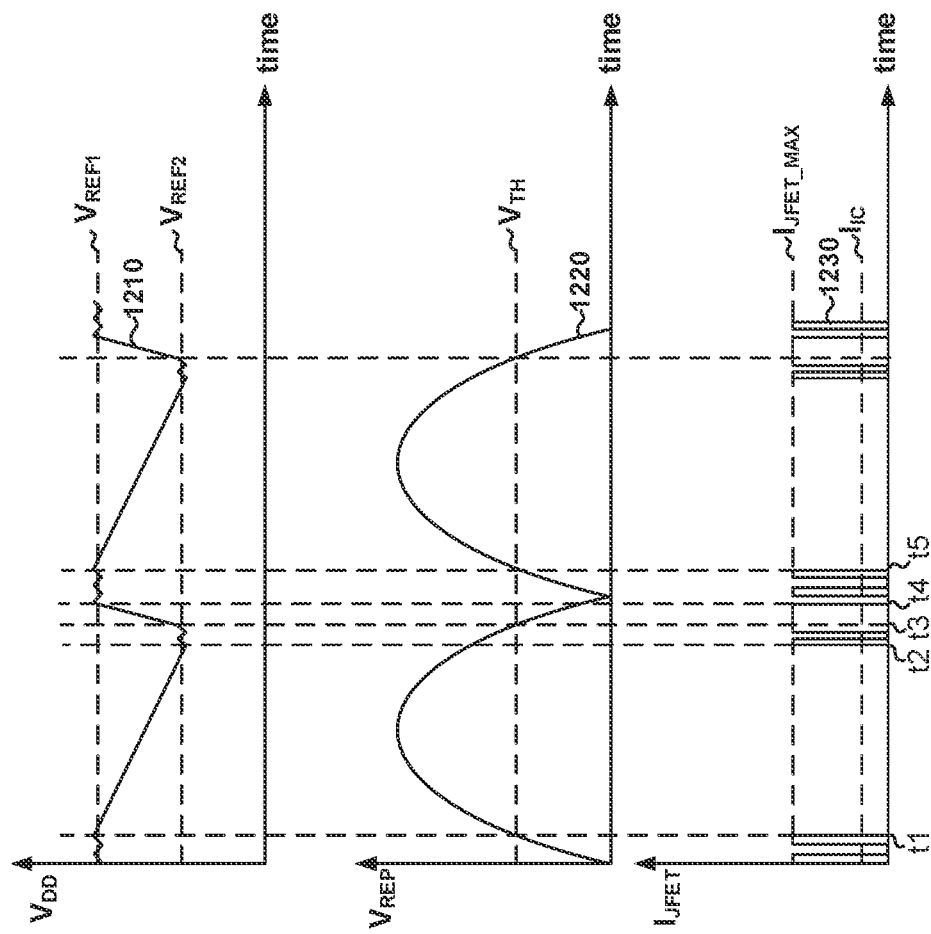
FIG. 12 is a simplified timing diagram for the power converter as shown in FIG. 7 according to some embodiments of the present invention.

FIG. 12 is a simplified timing diagram for the power converter 700 as shown in FIG. 7 according to some embodiments of the present invention. This diagram is merely an example, which should not unduly limit the scope of the claims. One of ordinary skill in the art would recognize many variations, alternatives, and modifications. The waveform 1210 represents the voltage 766 (e.g., $V_{DD}$) as a function of time, the waveform 1220 represents the signal 798 (e.g., $V_{REP}$) as a function of time, and the waveform 1230 represents the current 796 (e.g., $I_{JFET}$) as a function of time. For example, the power converter 700 is an AC-to-DC buck converter, which operates in the quasi-resonant (QR) mode with constant on-time, and the signal 798 (e.g., $V_{REP}$) is proportional (e.g., directly proportional) to the voltage 762 (e.g., $V_{HV}$).

According to certain embodiments, at time $t_1$, the signal 798 (e.g., $V_{REP}$) becomes larger than the signal 797 (e.g., $V_{TH}$) in magnitude, as shown by the waveform 1220. In some examples, at time $t_1$, the voltage received by the comparator 784 at the terminal 770 changes from the voltage 764 (e.g., $V_{REF1}$) to the voltage 765 (e.g., $V_{REF2}$). In certain examples, at time $t_1$, the voltage 766 (e.g., $V_{DD}$) becomes larger than the voltage (e.g., $V_{REF2}$) received by the comparator 784 at the terminal 770, the signal 768 changes from the logic high level to the logic low level, and the JFET 780 becomes being turned off by the signal 768 at the logic low level. In some examples, at time $t_1$, as shown by the waveform 1230, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

According to some embodiments, from time $t_1$ to time $t_2$, the signal 798 (e.g., $V_{REP}$) remains larger than the signal 797 (e.g., $V_{TH}$) in magnitude, as shown by the waveform 1220. In some examples, from time $t_1$ to time $t_2$, the voltage received by the comparator 784 at the terminal 770 remains to be the voltage 765 (e.g., $V_{REF2}$). In certain examples, from time $t_1$ to time $t_2$, the voltage 766 (e.g., $V_{DD}$) remains larger than the voltage (e.g., $V_{REF2}$) received by the comparator 784 at the terminal 770, the signal 768 remains at the logic low level, and the JFET 780 remains turned off. In some examples, from time $t_1$ to time $t_2$, the magnitude of the current 796 (e.g., $I_{JFET}$) remains equal to zero as shown by the waveform 1230, and the current 796 does not charge the capacitor 732. In some examples, from time $t_1$ to time $t_2$, the voltage 766 (e.g., $V_{DD}$) decreases with time, even though the voltage 766 (e.g., $V_{DD}$) remains larger than the voltage (e.g., $V_{REF2}$) received by the comparator 784 at the terminal 770, as shown by the waveform 1210. In certain examples, from time $t_1$ to time $t_2$, the magnitude of the current 796 (e.g., $I_{JFET}$) remains equal to zero, and the voltage 766 (e.g., $V_{DD}$) decreases with time due to an operating current (e.g., $I_{IC}$) of the controller 720 (e.g., a chip).

According to certain embodiments, at time $t_2$, the signal 798 (e.g., $V_{REP}$) remains larger than the signal 797 (e.g., $V_{TH}$) in magnitude, as shown by the waveform 1220. In some examples, at time $t_2$, the voltage received by the comparator 784 at the terminal 770 remains to be the voltage 765 (e.g., $V_{REF2}$). In certain examples, at time $t_2$, the voltage 766 (e.g., $V_{DD}$) becomes smaller than the voltage (e.g., $V_{REF2}$) received by the comparator 784 at the terminal 770, the signal 768 changes from the logic low level to the logic high level, and the JFET 780 becomes being turned on by the signal 768 at the logic high level. In some examples, at time $t_2$, as shown by the waveform 1230, the magnitude of the current 796 (e.g., $I_{JFET}$) changes from zero to the maximum current (e.g., $I_{JFET\_MAX}$) that the junction-gate field-effect transistor (JFET) 780 can provide, and the current 796 charges the capacitor 732.

According to some embodiments, from time $t_2$ to time $t_3$, the signal 798 (e.g., $V_{REP}$) remains larger than the signal 797 (e.g., $V_{TH}$) in magnitude, as shown by the waveform 1220. In some examples, from time $t_2$ to time $t_3$, the voltage received by the comparator 784 at the terminal 770 remains to be the voltage 765 (e.g., $V_{REF2}$). In certain examples, from time $t_2$ to time $t_3$, the voltage 766 (e.g., $V_{DD}$) is regulated around the voltage 765 (e.g., $V_{REF2}$) as shown by the waveform 1210, the signal 768 changes between being at the logic high level and being at the logic low level, and the JFET 780 changes between being turned on and being turned off. In some examples, from time $t_2$ to time $t_3$, the magnitude of the current 796 (e.g., $I_{JFET}$) changes between being equal to the maximum current (e.g., $I_{JFET\_MAX}$) that the junction-gate field-effect transistor (JFET) 780 can provide and being equal to zero, as shown by the waveform 1230. In certain examples, from time $t_2$ to time $t_3$, the current 796 changes between charging the capacitor 732 and not charging the capacitor 732.

According to certain embodiments, at time $t_3$, the signal 798 (e.g., $V_{REP}$) becomes smaller than the signal 797 (e.g., $V_{TH}$) in magnitude, as shown by the waveform 1220. In some examples, at time $t_3$, the voltage received by the comparator 784 at the terminal 770 changes from the voltage 765 (e.g., $V_{REF2}$) to the voltage 764 (e.g., $V_{REF1}$). In certain examples, at time $t_3$, the voltage 766 (e.g., $V_{DD}$) becomes smaller than the voltage (e.g., $V_{REF1}$) received by the comparator 784 at the terminal 770, the signal 768 is at the logic high level, and the JFET 780 is turned on by the signal 768 at the logic high level. In some examples, at time $t_3$, as shown by the waveform 1230, the magnitude of the current 796 (e.g., $I_{JFET}$) is equal to the maximum current (e.g., $I_{JFET\_MAX}$) that the junction-gate field-effect transistor (JFET) 780 can provide, and the current 796 charges the capacitor 732.

According to some embodiments, from time $t_3$ to time $t_4$, the signal 798 (e.g., $V_{REP}$) remains smaller than the signal 797 (e.g., $V_{TH}$) in magnitude, as shown by the waveform 1220. In some examples, from time $t_3$ to time $t_4$, the voltage received by the comparator 784 at the terminal 770 remains to be the voltage 764 (e.g., $V_{REF1}$). In certain examples, from time $t_3$ to time $t_4$, the voltage 766 (e.g., $V_{DD}$) remains smaller than the voltage (e.g., $V_{REF1}$) received by the comparator 784 at the terminal 770, the signal 768 remains at the logic high level, and the JFET 780 remains turned on. In some examples, from time $t_3$ to time $t_4$, the magnitude of the current 796 (e.g., $I_{JFET}$) remains equal to the maximum current (e.g., $I_{JFET\_MAX}$) that the junction-gate field-effect transistor (JFET) 780 can provide as shown by the waveform 1230, and the current 796 charges the capacitor 732. In some examples, from time $t_3$ to time $t_4$, the voltage 766 (e.g., $V_{DD}$) increases with time, even though the voltage 766 (e.g., $V_{DD}$) remains smaller than the voltage (e.g., $V_{REF1}$) received by the comparator 784 at the terminal 770, as shown by the waveform 1210.

According to certain embodiments, at time $t_4$, the signal 798 (e.g., $V_{REP}$) remains smaller than the signal 797 (e.g., $V_{TH}$) in magnitude, as shown by the waveform 1220. In some examples, at time $t_4$, the voltage received by the comparator 784 at the terminal 770 remains to be the voltage 764 (e.g., $V_{REF1}$). In certain examples, at time $t_4$, the voltage 766 (e.g., $V_{DD}$) becomes larger than the voltage 764 (e.g., $V_{REF1}$) received by the comparator 784 at the terminal 770, the signal 768 changes from the logic high level to the logic low level, and the JFET 780 becomes being turned off by the signal 768 at the logic low level. In some examples, at time ta, as shown by the waveform 1230, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

According to some embodiments, from time $t_4$ to time $t_5$, the signal 798 (e.g., $V_{REP}$) remains smaller than the signal 797 (e.g., $V_{TH}$) in magnitude, as shown by the waveform 1220. In some examples, from time $t_4$ to time $t_5$, the voltage received by the comparator 784 at the terminal 770 remains to be the voltage 764 (e.g., $V_{REF1}$). In certain examples, from time $t_4$ to time $t_5$, the voltage 766 (e.g., $V_{DD}$) is regulated around the voltage 764 (e.g., $V_{REF1}$) as shown by the waveform 1210, the signal 768 changes between being at the logic low level and being at the logic high level, and the JFET 780 changes between being turned off and being turned on. In some examples, from time $t_4$ to time $t_5$, the magnitude of the current 796 (e.g., $I_{JFET}$) changes between being equal to zero and being equal to the maximum current (e.g., $I_{JFET\_MAX}$) that the junction-gate field-effect transistor (JFET) 780 can provide, as shown by the waveform 1230. In certain examples, from time $t_4$ to time $t_5$, the current 796 changes between not charging the capacitor 732 and charging the capacitor 732.

According to certain embodiments, at time $t_5$, the signal 798 (e.g., $V_{REP}$) becomes larger than the signal 797 (e.g., $V_{TH}$) in magnitude, as shown by the waveform 1220. In some examples, at time $t_5$, the voltage received by the comparator 784 at the terminal 770 changes from the voltage 764 (e.g., $V_{REF1}$) to the voltage 765 (e.g., $V_{REF2}$). In certain examples, at time $t_5$, the voltage 766 (e.g., $V_{DD}$) becomes larger than the voltage (e.g., $V_{REF2}$) received by the comparator 784 at the terminal 770, the signal 768 changes from the logic high level to the logic low level, and the JFET 780 becomes being turned off by the signal 768 at the logic low level. In some examples, at time $t_5$, as shown by the waveform 1230, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

As shown in FIG. 12, the average magnitude of the current 796 (e.g., $I_{JFET}$) is equal to the operating current (e.g., $I_{IC}$) of the controller 720, as shown by the waveform 1230, according to certain embodiments.

As discussed above and further emphasized here, FIG. 12 is merely an example, which should not unduly limit the scope of the claims. One of ordinary skill in the art would recognize many variations, alternatives, and modifications. For example, the waveforms 1210, 1220 and 1230 can be varied by changing the signal 797 (e.g., $V_{TH}$), the voltage 764 (e.g., $V_{REF1}$), the voltage 765 (e.g., $V_{REF2}$), the maximum current (e.g., $I_{JFET\_MAX}$) that the junction-gate field-effect transistor (JFET) 780 can provide, and/or the capacitance of the capacitor 732 in magnitude.

In some embodiments, the voltage 766 (e.g., $V_{DD}$) does not fall below the voltage 765 (e.g., $V_{REF2}$), and the voltage 766 (e.g., $V_{DD}$) remains higher than the voltage 765 (e.g., $V_{REF2}$), as shown, for example, by FIG. 13. In certain embodiments, the voltage 766 (e.g., $V_{DD}$) does not rise above the voltage 764 (e.g., $V_{REF1}$), and the voltage 766 (e.g., $V_{DD}$) remains lower than the voltage 764 (e.g., $V_{REF1}$), as shown, for example, by FIG. 14.

Figure 13:
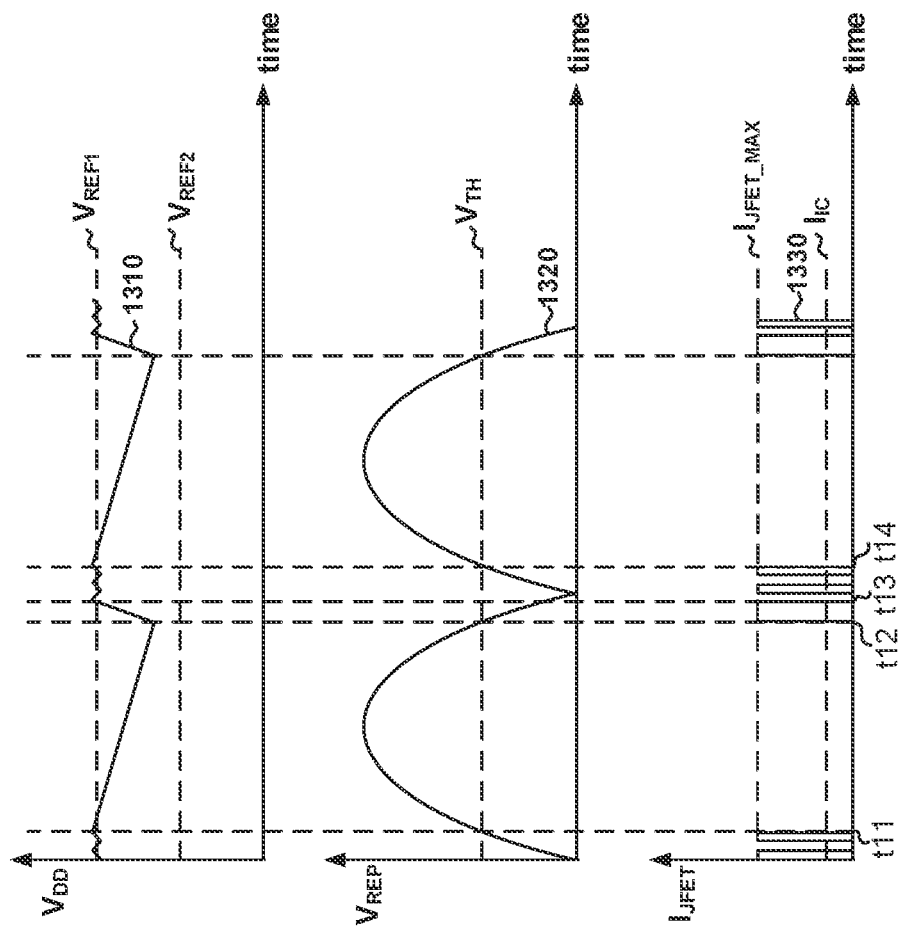
FIG. 13 is a simplified timing diagram for the power converter as shown in FIG. 7 according to some embodiments of the present invention.

FIG. 13 is a simplified timing diagram for the power converter 700 as shown in FIG. 7 according to some embodiments of the present invention. This diagram is merely an example, which should not unduly limit the scope of the claims. One of ordinary skill in the art would recognize many variations, alternatives, and modifications. The waveform 1310 represents the voltage 766 (e.g., $V_{DD}$) as a function of time, the waveform 1320 represents the signal 798 (e.g., $V_{REP}$) as a function of time, and the waveform 1330 represents the current 796 (e.g., $I_{JFET}$) as a function of time. For example, the power converter 700 is an AC-to-DC buck converter, which operates in the quasi-resonant (QR) mode with constant on-time, and the signal 798 (e.g., $V_{REP}$) is proportional (e.g., directly proportional) to the voltage 762 (e.g., $V_{HV}$).

According to certain embodiments, at time $t_{11}$, the signal 798 (e.g., $V_{REP}$) becomes larger than the signal 797 (e.g., $V_{TH}$) in magnitude, as shown by the waveform 1320. In some examples, at time $t_{11}$, the voltage received by the comparator 784 at the terminal 770 changes from the voltage 764 (e.g., $V_{REF1}$) to the voltage 765 (e.g., $V_{REF2}$). In certain examples, at time $t_{11}$, the voltage 766 (e.g., $V_{DD}$) becomes larger than the voltage (e.g., $V_{REF2}$) received by the comparator 784 at the terminal 770, the signal 768 changes from the logic high level to the logic low level, and the JFET 780 becomes being turned off by the signal 768 at the logic low level. In some examples, at time $t_{11}$, as shown by the waveform 1330, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

According to some embodiments, from time $t_{11}$ to time $t_{12}$, the signal 798 (e.g., $V_{REP}$) remains larger than the signal 797 (e.g., $V_{TH}$) in magnitude, as shown by the waveform 1320. In some examples, from time $t_{11}$ to time $t_{12}$, the voltage received by the comparator 784 at the terminal 770 remains to be the voltage 765 (e.g., $V_{REF2}$). In certain examples, from time $t_{11}$ to time $t_{12}$, the voltage 766 (e.g., $V_{DD}$) remains larger than the voltage (e.g., $V_{REF2}$) received by the comparator 784 at the terminal 770, the signal 768 remains at the logic low level, and the JFET 780 remains turned off. In some examples, from time $t_{11}$ to time $t_{12}$, the magnitude of the current 796 (e.g., $I_{JFET}$) remains equal to zero as shown by the waveform 1330, and the current 796 does not charge the capacitor 732. In some examples, from time $t_{11}$ to time $t_{12}$, the voltage 766 (e.g., $V_{DD}$) decreases with time, even though the voltage 766 (e.g., $V_{DD}$) remains larger than the voltage (e.g., $V_{REF2}$) received by the comparator 784 at the terminal 770, as shown by the waveform 1310. In certain examples, from time $t_{11}$ to time $t_{12}$, the magnitude of the current 796 (e.g., $I_{JFET}$) remains equal to zero, and the voltage 766 (e.g., $V_{DD}$) decreases with time due to the operating current (e.g., $I_{IC}$) of the controller 720 (e.g., a chip).

According to certain embodiments, at time $t_{12}$, the signal 798 (e.g., $V_{REP}$) becomes smaller than the signal 797 (e.g., $V_{TH}$) in magnitude, as shown by the waveform 1320. In some examples, at time $t_{12}$, the voltage received by the comparator 784 at the terminal 770 changes from the voltage 765 (e.g., $V_{REF2}$) to the voltage 764 (e.g., $V_{REF1}$). In certain examples, at time $t_{12}$, the voltage 766 (e.g., $V_{DD}$) becomes smaller than the voltage received by the comparator 784 at the terminal 770, the signal 768 changes from the logic low level to the logic high level, and the JFET 780 becomes being turned on by the signal 768 at the logic high level. In some examples, at time $t_{12}$, as shown by the waveform 1330, the magnitude of the current 796 (e.g., $I_{JFET}$) changes from zero to the maximum current (e.g., $I_{JFET\_MAX}$) that the junction-gate field-effect transistor (JFET) 780 can provide, and the current 796 charges the capacitor 732.

According to some embodiments, from time $t_{12}$ to time $t_{13}$, the signal 798 (e.g., $V_{REP}$) remains smaller than the signal 797 (e.g., $V_{TH}$) in magnitude, as shown by the waveform 1320. In some examples, from time $t_{12}$ to time $t_{13}$, the voltage received by the comparator 784 at the terminal 770 remains to be the voltage 764 (e.g., $V_{REF1}$). In certain examples, from time $t_{12}$ to time $t_{13}$, the voltage 766 (e.g., $V_{DD}$) remains smaller than the voltage (e.g., $V_{REF1}$) received by the comparator 784 at the terminal 770, the signal 768 remains at the logic high level, and the JFET 780 remains turned on. In some examples, from time $t_{12}$ to time $t_{13}$, the magnitude of the current 796 (e.g., $I_{JFET}$) remains equal to the maximum current (e.g., $I_{JFET\_MAX}$) that the junction-gate field-effect transistor (JFET) 780 can provide as shown by the waveform 1330, and the current 796 charges the capacitor 732. In some examples, from time $t_{12}$ to time $t_{13}$, the voltage 766 (e.g., $V_{DD}$) increases with time, even though the voltage 766 (e.g., $V_{DD}$) remains smaller than the voltage (e.g., $V_{REF1}$) received by the comparator 784 at the terminal 770, as shown by the waveform 1310.

According to certain embodiments, at time $t_{13}$, the signal 798 (e.g., $V_{REP}$) remains smaller than the signal 797 (e.g., $V_{TH}$) in magnitude, as shown by the waveform 1320. In some examples, at time $t_{13}$, the voltage received by the comparator 784 at the terminal 770 remains to be the voltage 764 (e.g., $V_{REF1}$). In certain examples, at time $t_{13}$, the voltage 766 (e.g., $V_{DD}$) becomes larger than the voltage 764 (e.g., $V_{REF1}$) received by the comparator 784 at the terminal 770, the signal 768 changes from the logic high level to the logic low level, and the JFET 780 becomes being turned off by the signal 768 at the logic low level. In some examples, at time $t_{13}$, as shown by the waveform 1330, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

According to some embodiments, from time $t_{13}$ to time $t_{14}$, the signal 798 (e.g., $V_{REP}$) remains smaller than the signal 797 (e.g., $V_{TH}$) in magnitude, as shown by the waveform 1320. In some examples, from time $t_{13}$ to time $t_{14}$, the voltage received by the comparator 784 at the terminal 770 remains to be the voltage 764 (e.g., $V_{REF1}$). In certain examples, from time $t_{13}$ to time $t_{14}$, the voltage 766 (e.g., $V_{DD}$) is regulated around the voltage 764 (e.g., $V_{REF1}$) as shown by the waveform 1310, the signal 768 changes between being at the logic low level and being at the logic high level, and the JFET 780 changes between being turned off and being turned on. In some examples, from time $t_{13}$ to time $t_{14}$, the magnitude of the current 796 (e.g., $I_{JFET}$) changes between being equal to zero and being equal to the maximum current (e.g., $I_{JFET\_MAX}$) that the junction-gate field-effect transistor (JFET) 780 can provide, as shown by the waveform 1330. In certain examples, from time $t_{13}$ to time $t_{14}$, the current 796 changes between not charging the capacitor 732 and charging the capacitor 732.

As shown in FIG. 13, the average magnitude of the current 796 (e.g., $I_{JFET}$) is equal to the operating current (e.g., $I_{IC}$) of the controller 720, as shown by the waveform 1330, according to certain embodiments.

Figure 14:
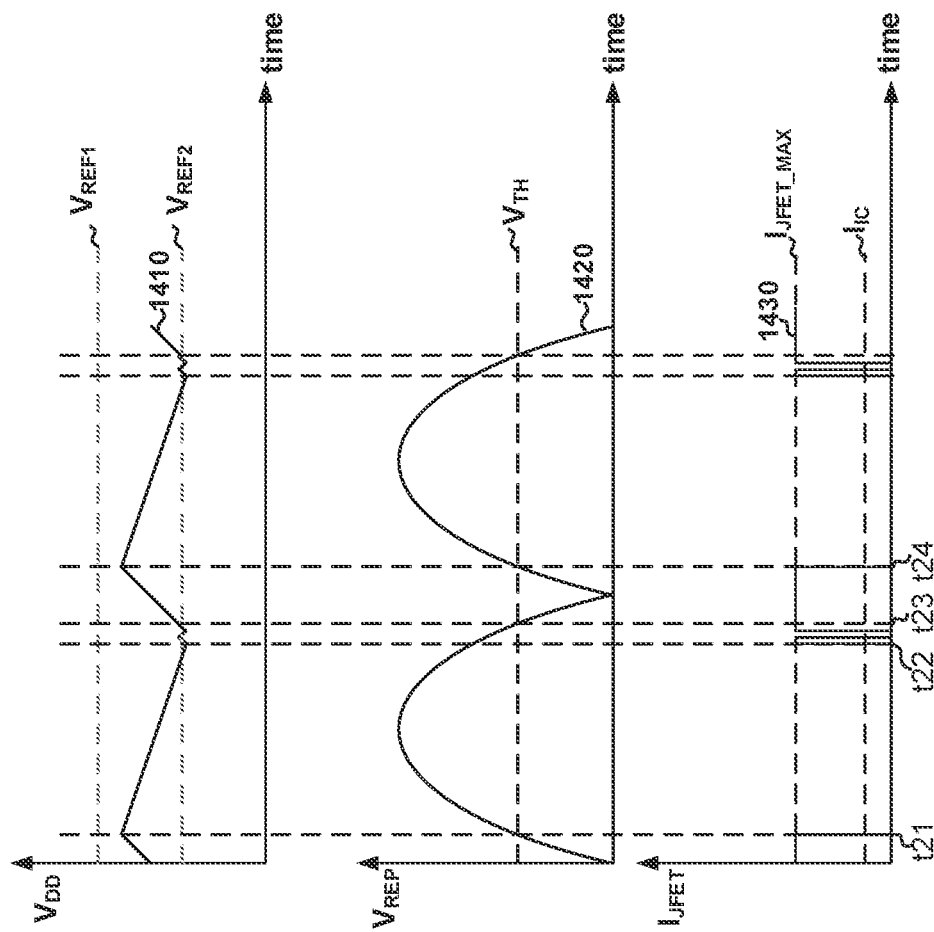
FIG. 14 is a simplified timing diagram for the power converter as shown in FIG. 7 according to certain embodiments of the present invention.

FIG. 14 is a simplified timing diagram for the power converter 700 as shown in FIG. 7 according to certain embodiments of the present invention. This diagram is merely an example, which should not unduly limit the scope of the claims. One of ordinary skill in the art would recognize many variations, alternatives, and modifications. The waveform 1410 represents the voltage 766 (e.g., $V_{DD}$) as a function of time, the waveform 1420 represents the signal 798 (e.g., $V_{REP}$) as a function of time, and the waveform 1430 represents the current 796 (e.g., $I_{JFET}$) as a function of time. For example, the power converter 700 is an AC-to-DC buck converter, which operates in the quasi-resonant (QR) mode with constant on-time, and the signal 798 (e.g., $V_{REP}$) is proportional (e.g., directly proportional) to the voltage 762 (e.g., $V_{HV}$).

According to certain embodiments, at time $t_{21}$, the signal 798 (e.g., $V_{REP}$) becomes larger than the signal 797 (e.g., $V_{TH}$) in magnitude, as shown by the waveform 1420. In some examples, at time $t_{21}$, the voltage received by the comparator 784 at the terminal 770 changes from the voltage 764 (e.g., $V_{REF1}$) to the voltage 765 (e.g., $V_{REF2}$). In certain examples, at time $t_{21}$, the voltage 766 (e.g., $V_{DD}$) becomes larger than the voltage (e.g., $V_{REF2}$) received by the comparator 784 at the terminal 770, the signal 768 changes from the logic high level to the logic low level, and the JFET 780 becomes being turned off by the signal 768 at the logic low level. In some examples, at time $t_{21}$, as shown by the waveform 1430, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

According to some embodiments, from time $t_{21}$ to time $t_{22}$, the signal 798 (e.g., $V_{REP}$) remains larger than the signal 797 (e.g., $V_{TH}$) in magnitude, as shown by the waveform 1420. In some examples, from time $t_{21}$ to time $t_{22}$, the voltage received by the comparator 784 at the terminal 770 remains to be the voltage 765 (e.g., $V_{REF2}$). In certain examples, from time $t_{21}$ to time $t_{22}$, the voltage 766 (e.g., $V_{DD}$) remains larger than the voltage (e.g., $V_{REF2}$) received by the comparator 784 at the terminal 770, the signal 768 remains at the logic low level, and the JFET 780 remains turned off. In some examples, from time $t_{21}$ to time $t_{22}$, the magnitude of the current 796 (e.g., $I_{JFET}$) remains equal to zero as shown by the waveform 1430, and the current 796 does not charge the capacitor 732. In some examples, from time $t_{21}$ to time $t_{22}$, the voltage 766 (e.g., $V_{DD}$) decreases with time, even though the voltage 766 (e.g., $V_{DD}$) remains larger than the voltage (e.g., $V_{REF2}$) received by the comparator 784 at the terminal 770, as shown by the waveform 1410. In certain examples, from time $t_{21}$ to time $t_{22}$, the magnitude of the current 796 (e.g., $I_{JFET}$) remains equal to zero, and the voltage 766 (e.g., $V_{DD}$) decreases with time due to the operating current (e.g., $I_{IC}$) of the controller 720 (e.g., a chip).

According to certain embodiments, at time $t_{22}$, the signal 798 (e.g., $V_{REP}$) remains larger than the signal 797 (e.g., $V_{TH}$) in magnitude, as shown by the waveform 1420. In some examples, at time $t_{22}$, the voltage received by the comparator 784 at the terminal 770 remains to be the voltage 765 (e.g., $V_{REF2}$). In certain examples, at time $t_{22}$, the voltage 766 (e.g., $V_{DD}$) becomes smaller than the voltage (e.g., $V_{REF2}$) received by the comparator 784 at the terminal 770, the signal 768 changes from the logic low level to the logic high level, and the JFET 780 becomes being turned on by the signal 768 at the logic high level. In some examples, at time $t_{22}$, as shown by the waveform 1430, the magnitude of the current 796 (e.g., $I_{JFET}$) changes from zero to the maximum current (e.g., $I_{JFET\_MAX}$) that the junction-gate field-effect transistor (JFET) 780 can provide, and the current 796 charges the capacitor 732.

According to some embodiments, from time $t_{22}$ to time $t_2$, the signal 798 (e.g., $V_{REP}$) remains larger than the signal 797 (e.g., $V_{TH}$) in magnitude, as shown by the waveform 1420. In some examples, from time $t_{22}$ to time $t_{23}$, the voltage received by the comparator 784 at the terminal 770 remains to be the voltage 765 (e.g., $V_{REF2}$). In certain examples, from time $t_{22}$ to time $t_{23}$, the voltage 766 (e.g., $V_{DD}$) is regulated around the voltage 765 (e.g., $V_{REF2}$) as shown by the waveform 1410, the signal 768 changes between being at the logic high level and being at the logic low level, and the JFET 780 changes between being turned on and being turned off. In some examples, from time $t_{22}$ to time $t_{23}$, the magnitude of the current 796 (e.g., $I_{JFET}$) changes between being equal to the maximum current (e.g., $I_{JFET\_MAX}$) that the junction-gate field-effect transistor (JFET) 780 can provide and being equal to zero, as shown by the waveform 1430. In certain examples, from time $t_{22}$ to time $t_2$, the current 796 changes between charging the capacitor 732 and not charging the capacitor 732.

According to certain embodiments, at time $t_{23}$, the signal 798 (e.g., $V_{REP}$) becomes smaller than the signal 797 (e.g., $V_{TH}$) in magnitude, as shown by the waveform 1420. In some examples, at time $t_{23}$, the voltage received by the comparator 784 at the terminal 770 changes from the voltage 765 (e.g., $V_{REF2}$) to the voltage 764 (e.g., $V_{REF1}$). In certain examples, at time $t_{23}$, the voltage 766 (e.g., $V_{DD}$) becomes smaller than the voltage received by the comparator 784 at the terminal 770, the signal 768 is at the logic high level, and the JFET 780 is turned on by the signal 768 at the logic high level. In some examples, at time $t_{23}$, as shown by the waveform 1430, the magnitude of the current 796 (e.g., $I_{JFET}$) is equal to the maximum current (e.g., $I_{JFET\_MAX}$) that the junction-gate field-effect transistor (JFET) 780 can provide, and the current 796 charges the capacitor 732.

According to some embodiments, from time $t_{23}$ to time $t_{24}$, the signal 798 (e.g., $V_{REP}$) remains smaller than the signal 797 (e.g., $V_{TH}$) in magnitude, as shown by the waveform 1420. In some examples, from time $t_{23}$ to time $t_{24}$, the voltage received by the comparator 784 at the terminal 770 remains to be the voltage 764 (e.g., $V_{REF1}$). In certain examples, from time $t_{23}$ to time $t_{24}$, the voltage 766 (e.g., $V_{DD}$) remains smaller than the voltage (e.g., $V_{REF1}$) received by the comparator 784 at the terminal 770, the signal 768 remains at the logic high level, and the JFET 780 remains turned on. In some examples, from time $t_{23}$ to time $t_{24}$, the magnitude of the current 796 (e.g., $I_{JFET}$) remains equal to the maximum current (e.g., $I_{JFET\_MAX}$) that the junction-gate field-effect transistor (JFET) 780 can provide as shown by the waveform 1430, and the current 796 charges the capacitor 732. In some examples, from time $t_{23}$ to time $t_{24}$, the voltage 766 (e.g., $V_{DD}$) increases with time, even though the voltage 766 (e.g., $V_{DD}$) remains smaller than the voltage (e.g., $V_{REF1}$) received by the comparator 784 at the terminal 770, as shown by the waveform 1410.

According to certain embodiments, at time $t_{24}$, the signal 798 (e.g., $V_{REP}$) becomes larger than the signal 797 (e.g., $V_{TH}$) in magnitude, as shown by the waveform 1420. In some examples, at time $t_{24}$, the voltage received by the comparator 784 at the terminal 770 changes from the voltage 764 (e.g., $V_{REF1}$) to the voltage 765 (e.g., $V_{REF2}$). In certain examples, at time $t_{24}$, the voltage 766 (e.g., $V_{DD}$) becomes larger than the voltage (e.g., $V_{REF2}$) received by the comparator 784 at the terminal 770, the signal 768 changes from the logic high level to the logic low level, and the JFET 780 becomes being turned off by the signal 768 at the logic low level. In some examples, at time $t_{24}$, as shown by the waveform 1430, the magnitude of the current 796 (e.g., $I_{JFET}$) changes to zero from the maximum current (e.g., $I_{JFET\_MAX}$) that the junction-gate field-effect transistor (JFET) 780 can provide, and the current 796 does not charge the capacitor 732.

As shown in FIG. 14, the average magnitude of the current 796 (e.g., $I_{JFET}$) is equal to the operating current (e.g., $I_{IC}$) of the controller 720, as shown by the waveform 1430, according to some embodiments.

Certain embodiments of the present invention provide a controller with a high voltage supply and also provide a related method for the controller. In some examples, the controller and the method can, for the same magnitude of high voltage supply, significantly reduce power loss caused at least in part by the high voltage supply. In certain examples, the controller and the method can, for the same magnitude of high voltage supply, significantly lower the temperature of the controller and significantly improve the system efficiency.

Some embodiments of the present invention provide a controller with a high voltage supply and also provide a related method for the controller. In certain examples, the controller and the method can turn off a switch (e.g., a junction-gate field-effect transistor) to stop charging of a capacitor when the high voltage supply becomes higher than a threshold (e.g., $V_{TH}$). In some examples, the controller and the method can turn on a switch (e.g., a junction-gate field-effect transistor) to allow charging of a capacitor when the high voltage supply becomes lower than a threshold (e.g., $V_{TH}$).

According to certain embodiments, a controller for a power converter includes: a first terminal configured to receive a first terminal voltage; a second terminal configured to receive a second terminal voltage; a comparator configured to receive a first threshold voltage and the second terminal voltage and to generate a comparison signal based at least in part on the first threshold voltage and the second terminal voltage; and a switch configured to receive the first terminal voltage and the comparison signal, the switch being further configured to be closed (e.g., turned on) to allow a current to flow out of the second terminal through the switch if the comparison signal is at a first logic level; wherein the comparator is further configured to: receive a first reference voltage as the first threshold voltage if the first terminal voltage is smaller than a second threshold voltage; and receive a second reference voltage as the first threshold voltage if the first terminal voltage is larger than the second threshold voltage; wherein the first reference voltage is larger than the second reference voltage; wherein the comparator is further configured to: generate the comparison signal at the first logic level if the first threshold voltage is larger than the second terminal voltage; and generate the comparison signal at a second logic level if the first threshold voltage is smaller than the second terminal voltage; wherein the second logic level is different from the first logic level. For example, the controller is implemented according to at least FIG. 7.

In some examples, the first logic level is a logic high level; and the second logic level is a logic low level. In certain examples, the switch is further configured to be opened (e.g., turned off) to allow no current to flow out of the second terminal through the switch if the comparison signal is at the second logic level. In some examples, the switch includes a transistor configured to be turned on to allow the current to flow out of the second terminal through the transistor if the comparison signal is at the first logic level. In certain examples, the transistor is further configured to be turned off to allow no current to flow out of the second terminal through the transistor if the comparison signal is at the second logic level. In some examples, the transistor is a junction-gate field-effect transistor. In certain examples, the second terminal is coupled to a capacitor configured to receive the current from the second terminal and provide the second terminal voltage to the second terminal.

According to some embodiments, a controller for a power converter includes: a first terminal configured to receive a first terminal voltage; a second terminal configured to receive a second terminal voltage; a first comparator configured to receive a first threshold voltage and a comparator input voltage and generate a first comparison signal based at least in part on the first threshold voltage and the comparator input voltage, the first comparator being further configured to generate the first comparison signal at a first logic level if the first threshold voltage is larger than the comparator input voltage and to generate the first comparison signal at a second logic level if the first threshold voltage is smaller than the comparator input voltage, the second logic level being different from the first logic level; a first switch configured to receive the first comparison signal and to output a second threshold voltage, the switch being further configured to output a first reference voltage as the second threshold voltage if the first comparison signal is at the first logic level and to output a second reference voltage as the second threshold voltage if the first comparison signal is at the second logic level, the second reference voltage being different from the first reference voltage; a second comparator configured to receive the second threshold voltage and the second terminal voltage and to generate a second comparison signal based at least in part on the second threshold voltage and the second terminal voltage, the second comparator being further configured to generate the second comparison signal at a third logic level if the second threshold voltage is larger than the second terminal voltage and to generate the second comparison signal at a fourth logic level if the second threshold voltage is smaller than the second terminal voltage, the fourth logic level being different from the third logic level; and a second switch configured to receive the first terminal voltage and the second comparison signal, the second switch being further configured to be closed (e.g., turned on) to allow a current to flow out of the second terminal through the second switch if the second comparison signal is at the third logic level; wherein the comparator input voltage is related to the first terminal voltage. For example, the controller is implemented according to at least FIG. 7.

In some examples, the first reference voltage is larger than the second reference voltage if the comparator input voltage increases with the increasing first terminal voltage and decreases with the decreasing first terminal voltage. In certain examples, the first reference voltage is smaller than the second reference voltage if the comparator input voltage decreases with the increasing first terminal voltage and increases with the decreasing first terminal voltage. In some examples, the first logic level and the third logic level are the same; and the second logic level and the fourth logic level are the same. In certain examples, the first logic level is a logic high level; the second logic level is a logic low level; the third logic level is the logic high level; and the fourth logic level is at the logic low level.

In some examples, the second switch is further configured to be opened (e.g., turned off) to allow no current to flow out of the second terminal through the second switch if the second comparison signal is at the fourth logic level. In certain examples, the second switch includes a transistor configured to be turned on to allow the current to flow out of the second terminal through the transistor if the second comparison signal is at the third logic level. In some examples, the transistor is further configured to be turned off to allow no current to flow out of the second terminal through the transistor if the second comparison signal is at the fourth logic level. In certain examples, the transistor is a junction-gate field-effect transistor. In some examples, the second terminal is coupled to a capacitor configured to receive the current from the second terminal and provide the second terminal voltage to the second terminal.

According to certain embodiments, a method for a power converter includes: receiving a first terminal voltage; receiving a second terminal voltage; receiving the second terminal voltage and a first threshold voltage; generating a comparison signal based at least in part on the second terminal voltage and the first threshold voltage; receiving the first terminal voltage and the comparison signal; and if the comparison signal is at a first logic level, closing (e.g., turning on) a switch to allow a current to flow through the switch; wherein the receiving the second terminal voltage and a first threshold voltage includes: receiving a first reference voltage as the first threshold voltage if the first terminal voltage is smaller than a second threshold voltage; and receiving a second reference voltage as the first threshold voltage if the first terminal voltage is larger than the second threshold voltage; wherein the first reference voltage is larger than the second reference voltage; wherein the generating a comparison signal based at least in part on the second terminal voltage and the first threshold voltage includes: generating the comparison signal at the first logic level if the first threshold voltage is larger than the second terminal voltage; and generating the comparison signal at a second logic level if the first threshold voltage is smaller than the second terminal voltage; wherein the second logic level is different from the first logic level. For example, the method is implemented according to at least FIG. 7.

In some examples, the first logic level is a logic high level; and the second logic level is a logic low level. In certain examples, the method further includes: if the comparison signal is at the second logic level, opening (e.g., turning off) the switch to allow no current to flow through the switch. In some examples, the method further includes: receiving the current by a capacitor; and providing the second terminal voltage by the capacitor.

According to some embodiments, a method for a power converter includes: receiving a first terminal voltage; receiving a second terminal voltage; receiving a first threshold voltage and a comparator input voltage; and generating a first comparison signal based at least in part on the first threshold voltage and the comparator input voltage. For example, the generating a first comparison signal based at least in part on the first threshold voltage and the comparator input voltage includes: generating the first comparison signal at a first logic level if the first threshold voltage is larger than the comparator input voltage; and generating the first comparison signal at a second logic level if the first threshold voltage is smaller than the comparator input voltage, the second logic level being different from the first logic level. In some examples, the method also includes: receiving the first comparison signal; and outputting a second threshold voltage based at least in part on the first comparison signal. For example, the outputting a second threshold voltage based at least in part on the first comparison signal includes: outputting a first reference voltage as the second threshold voltage if the first comparison signal is at the first logic level;

and outputting a second reference voltage as the second threshold voltage if the first comparison signal is at the second logic level, the second reference voltage being different from the first reference voltage. In certain examples, the method also includes: receiving the second threshold voltage and the second terminal voltage; and generating a second comparison signal based at least in part on the second threshold voltage and the second terminal voltage. For example, the generating a second comparison signal based at least in part on the second threshold voltage and the second terminal voltage includes: generating the second comparison signal at a third logic level if the second threshold voltage is larger than the second terminal voltage; and generating the second comparison signal at a fourth logic level if the second threshold voltage is smaller than the second terminal voltage, the fourth logic level being different from the third logic level. In some examples, the method also includes: receiving the first terminal voltage and the second comparison signal; and if the second comparison signal is at the third logic level, closing (e.g., turning on) a switch to allow a current to flow through the switch. For example, the comparator input voltage is related to the first terminal voltage. As an example, the method is implemented according to at least FIG. 7.

In some examples, the first reference voltage is larger than the second reference voltage if the comparator input voltage increases with the increasing first terminal voltage and decreases with the decreasing first terminal voltage. In certain examples, the first reference voltage is smaller than the second reference voltage if the comparator input voltage decreases with the increasing first terminal voltage and increases with the decreasing first terminal voltage. In some examples, the first logic level and the third logic level are the same; and the second logic level and the fourth logic level are the same. In certain examples, the first logic level is a logic high level; the second logic level is a logic low level; the third logic level is the logic high level; and the fourth logic level is at the logic low level. In some examples, the method further includes: if the second comparison signal is at the fourth logic level, opening (e.g., turning off) the switch to allow no current to flow through the switch. In certain examples, the method further includes: receiving the current by a capacitor; and providing the second terminal voltage by the capacitor.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A controller for a power converter, the controller comprising:
    a first terminal configured to receive a first terminal voltage;
    a second terminal configured to receive a second terminal voltage;
    a comparator configured to receive a first threshold voltage and the second terminal voltage and to generate a comparison signal based at least in part on the first threshold voltage and the second terminal voltage; and
    a switch configured to receive the first terminal voltage and the comparison signal, the switch being further configured to be closed to allow a current to flow out of the second terminal through the switch if the comparison signal is at a first logic level;
    wherein the comparator is further configured to:
        receive a first reference voltage as the first threshold voltage if the first terminal voltage is smaller than a second threshold voltage; and
        receive a second reference voltage as the first threshold voltage if the first terminal voltage is larger than the second threshold voltage;
        wherein the first reference voltage is larger than the second reference voltage.

2. The controller of claim 1,
    wherein the comparator is further configured to generate the comparison signal at a second logic level if the first threshold voltage is smaller than the second terminal voltage;
    wherein:
        the first logic level is a logic high level; and
        the second logic level is a logic low level.

3. The controller of claim 2 wherein the switch is further configured to be opened to allow no current to flow out of the second terminal through the switch if the comparison signal is at the second logic level.

4. The controller of claim 2 wherein the switch includes a transistor configured to be turned on to allow the current to flow out of the second terminal through the transistor if the comparison signal is at the first logic level.

5. The controller of claim 4 wherein the transistor is further configured to be turned off to allow no current to flow out of the second terminal through the transistor if the comparison signal is at the second logic level.

6. The controller of claim 4 wherein the transistor is a junction-gate field-effect transistor.

7. The controller of claim 1 wherein the second terminal is coupled to a capacitor configured to receive the current from the second terminal and provide the second terminal voltage to the second terminal.

8. A controller for a power converter, the controller comprising:
    a first terminal configured to receive a first terminal voltage;
    a second terminal configured to receive a second terminal voltage;
    a first comparator configured to receive a first threshold voltage and a comparator input voltage and generate a first comparison signal based at least in part on the first threshold voltage and the comparator input voltage;
    a first switch configured to receive the first comparison signal and to output a second threshold voltage, the first switch being further configured to output a first reference voltage as the second threshold voltage if the first comparison signal is at a first logic level having a first voltage value and to output a second reference voltage as the second threshold voltage if the first comparison signal is at a second logic level having a second voltage value, the second logic level being different from the first logic level, the second reference voltage being different from the first reference voltage; and
a second comparator configured to receive the second threshold voltage and the second terminal voltage and to generate a second comparison signal based at least in part on the second threshold voltage and the second terminal voltage, the second comparator being further configured to generate the second comparison signal at a third logic level having a third voltage value if the second threshold voltage is larger than the second terminal voltage and to generate the second comparison signal at a fourth logic level having a fourth voltage value if the second threshold voltage is smaller than the second terminal voltage, the fourth logic level being different from the third logic level.

9. The controller of claim 8 wherein the first reference voltage is larger than the second reference voltage if the comparator input voltage increases with the increasing first terminal voltage and decreases with the decreasing first terminal voltage.

10. The controller of claim 8 wherein the first reference voltage is smaller than the second reference voltage if the comparator input voltage decreases with the increasing first terminal voltage and increases with the decreasing first terminal voltage.

11. The controller of claim 8 wherein:
the first logic level and the third logic level are the same; and
the second logic level and the fourth logic level are the same.

12. The controller of claim 11 wherein:
the first logic level is a logic high level;
the second logic level is a logic low level;
the third logic level is the logic high level; and
the fourth logic level is at the logic low level.

13. The controller of claim 8, and further comprising:
a second switch configured to receive the first terminal voltage and the second comparison signal, the second switch being further configured to be closed to allow a current to flow out of the second terminal through the second switch if the second comparison signal is at the third logic level;
wherein the second switch is further configured to be opened to allow no current to flow out of the second terminal through the second switch if the second comparison signal is at the fourth logic level.

14. The controller of claim 8, and further comprising:
a second switch configured to receive the first terminal voltage and the second comparison signal, the second switch being further configured to be closed to allow a current to flow out of the second terminal through the second switch if the second comparison signal is at the third logic level;
wherein the second switch includes a transistor configured to be turned on to allow the current to flow out of the second terminal through the transistor if the second comparison signal is at the third logic level.

15. The controller of claim 14 wherein the transistor is further configured to be turned off to allow no current to flow out of the second terminal through the transistor if the second comparison signal is at the fourth logic level.

16. The controller of claim 14 wherein the transistor is a junction-gate field-effect transistor.

17. The controller of claim 8 wherein the second terminal is coupled to a capacitor configured to receive the current from the second terminal and provide the second terminal voltage to the second terminal.

18. A method for a power converter, the method comprising:
receiving a first terminal voltage;
receiving a second terminal voltage;
receiving the second terminal voltage and a first threshold voltage;
generating a comparison signal based at least in part on the second terminal voltage and the first threshold voltage;
receiving the first terminal voltage and the comparison signal; and
if the comparison signal is at a first logic level, closing a switch to allow a current to flow through the switch;
wherein the receiving the second terminal voltage and a first threshold voltage includes:
receiving a first reference voltage as the first threshold voltage if the first terminal voltage is smaller than a second threshold voltage; and
receiving a second reference voltage as the first threshold voltage if the first terminal voltage is larger than the second threshold voltage;
wherein the first reference voltage is larger than the second reference voltage.

19. The method of claim 18 wherein the generating a comparison signal based at least in part on the second terminal voltage and the first threshold voltage includes:
generating the comparison signal at a second logic level if the first threshold voltage is smaller than the second terminal voltage;
wherein:
the first logic level is a logic high level; and
the second logic level is a logic low level.

20. The method of claim 19, and further comprising:
if the comparison signal is at the second logic level, opening the switch to allow no current to flow through the switch.

21. The method of claim 18, and further comprising:
receiving the current by a capacitor; and
providing the second terminal voltage by the capacitor.

22. A method for a power converter, the method comprising:
receiving a first terminal voltage;
receiving a second terminal voltage;
receiving a first threshold voltage and a comparator input voltage;
generating a first comparison signal based at least in part on the first threshold voltage and the comparator input voltage;
receiving the first comparison signal;
outputting a second threshold voltage based at least in part on the first comparison signal, wherein the outputting a second threshold voltage based at least in part on the first comparison signal includes:
outputting a first reference voltage as the second threshold voltage if the first comparison signal is at a first logic level having a first voltage value; and
outputting a second reference voltage as the second threshold voltage if the first comparison signal is at a second logic level having a second voltage value, the second logic level being different from the first logic level, the second reference voltage being different from the first reference voltage;
receiving the second threshold voltage and the second terminal voltage; and
generating a second comparison signal based at least in part on the second threshold voltage and the second terminal voltage, wherein the generating a second comparison signal based at least in part on the second threshold voltage and the second terminal voltage includes:
generating the second comparison signal at a third logic level having a third voltage value if the second threshold voltage is larger than the second terminal voltage; and
generating the second comparison signal at a fourth logic level having a fourth voltage value if the second threshold voltage is smaller than the second terminal voltage, the fourth logic level being different from the third logic level.

23. The method of claim 22 wherein the first reference voltage is larger than the second reference voltage if the comparator input voltage increases with the increasing first terminal voltage and decreases with the decreasing first terminal voltage.

24. The method of claim 22 wherein the first reference voltage is smaller than the second reference voltage if the comparator input voltage decreases with the increasing first terminal voltage and increases with the decreasing first terminal voltage.

25. The method of claim 22 wherein:
the first logic level and the third logic level are the same; and
the second logic level and the fourth logic level are the same.

26. The method of claim 25, wherein:
the first logic level is a logic high level;
the second logic level is a logic low level;
the third logic level is the logic high level; and
the fourth logic level is at the logic low level.

27. The method of claim 22, and further comprising:
if the second comparison signal is at the third logic level, closing a switch to allow a current to flow through the switch; and
if the second comparison signal is at the fourth logic level, opening the switch to allow no current to flow through the switch.

28. The method of claim 22, and further comprising:
receiving the current by a capacitor; and
providing the second terminal voltage by the capacitor.

* * * * *